United States Patent
Feng et al.

(10) Patent No.: US 6,453,095 B2
(45) Date of Patent: Sep. 17, 2002

(54) TUNING OF OPTICAL DISPERSION BY USING A TUNABLE FIBER BRAGG GRATING

(75) Inventors: Kai-Ming Feng, Milpitas, CA (US); Jin-Xing Cai, Ocean, NJ (US); Alan E. Willner, Los Angeles, CA (US); Victor Grubsky, Los Angeles, CA (US); Dmitry Starodubov, Los Angeles, CA (US); Jack Feinberg, Manhattan Beach, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/827,819

(22) Filed: Apr. 6, 2001

Related U.S. Application Data

(63) Continuation of application No. 09/253,645, filed on Feb. 19, 1999, which is a continuation-in-part of application No. 09/027,345, filed on Feb. 20, 1998, now Pat. No. 5,982,963.
(60) Provisional application No. 60/069,498, filed on Dec. 15, 1997.

(51) Int. Cl.[7] .................................................. G02B 6/34
(52) U.S. Cl. ............................. 385/37; 385/24; 359/130
(58) Field of Search ................................ 385/16–18, 24, 385/31, 37, 39, 47, 11; 359/115, 117, 122–128, 130

(56) References Cited

U.S. PATENT DOCUMENTS

| | | |
|---|---|---|
| 5,450,427 A | 9/1995 | Fermann et al. |
| 5,499,134 A | 3/1996 | Galvanauskas et al. |
| 5,511,083 A | 4/1996 | D'Amato et al. |
| 5,532,868 A | 7/1996 | Gnauck et al. |
| 5,541,947 A | 7/1996 | Mourou et al. |
| 5,633,885 A | 5/1997 | Galvanauskas et al. |
| 5,675,674 A | 10/1997 | Weis |
| 5,808,779 A | 9/1998 | Weis |
| 5,978,131 A * | 11/1999 | Lauzon et al. ............... 359/341 |

(List continued on next page.)

FOREIGN PATENT DOCUMENTS

WO    WO 99/22255    5/1999

OTHER PUBLICATIONS

Ibsen et al., "Sinc–Sampled Fiber Bragg Gratings for Identical Multiple Wavelength Operation," IEEE Photonics Technology Letters, vol. 10, No. 6, pp. 842–844, Jun. 1998.
Cruz et al., "Fibre Bragg gratings tuned and chirped using magnetic fields," Electronics Letters, vol. 33, No. 3, pp. 235–236, Jan. 30, 1997.
Tomizawa et al., "Nonlinear influence on PM–AM conversion measurement of group velocity dispersion in optical fibres," Electronics Letters, vol. 30, No. 17, pp. 1434–1435, Aug. 18, 1994.

(List continued on next page.)

*Primary Examiner*—Rodney Bovernick
*Assistant Examiner*—Michelle R. Connelly-Cushwa
(74) *Attorney, Agent, or Firm*—Fish & Richardson P.C.

(57) ABSTRACT

Techniques and devices based on a wave-guiding element which has a spatial grating pattern that is an oscillatory variation along its optic axis. The wave-guiding element is configured to receive an input optical signal and to produce an output optical signal by reflection within a Bragg reflection band produced by the spatial grating pattern so as to produce time delays of different reflected spectral components as a nonlinear function of spatial positions along said optic axis at which the different reflected spectral components are respectively reflected. Such a wave-guiding element may be a nonlinearly chirped fiber grating A control unit may be engaged to the wave-guiding element and is operable to change a property of the spatial grating pattern along the optic axis to tune at least relative time delays of the different reflected spectral components nonlinearly with respect to wavelength.

74 Claims, 24 Drawing Sheets

U.S. PATENT DOCUMENTS

| | | | | |
|---|---|---|---|---|
| 5,982,963 A | * | 11/1999 | Feng et al. | 385/37 |
| 5,999,546 A | | 12/1999 | Espindola et al. | |
| 5,999,671 A | | 12/1999 | Jin et al. | |
| 6,014,480 A | * | 1/2000 | Baney | 385/24 |
| 6,081,640 A | | 6/2000 | Ouellette et al. | |
| 6,169,829 B1 | * | 1/2001 | Laming et al. | 385/37 |

OTHER PUBLICATIONS

Ronald D. Esman, "High bandwidth traveling wave polymeric in–line fiber modulator"CLEO'97 Microvave/Analog Technology, p. 293, May 21, 1997.

Arce–Diego et al., "Fiber Bragg grating as an optical filter tuned by a magnetic field," Optics Letters, vol. 22, No. 9, pp. 603–605, May 1, 1997.

Nuyts et al., "Performance Improvement of 10 Gb/s Standard Fiber Transmission Systems by Using the SPM Effect in the Dispersion Compensating Fiber," IEEE Photonics Technology Letters, vol. 8, No. 10, pp. 1406–1408, Oct. 1996.

Liu et al., "Improved Efficiency Narrow–Band Acoustooptic Tunable Reflector using Fibre Bragg Grating", publisher: Optical Society of America, Washington, DC, USA, pp. 338–341, Conference Location: Williamsburg, VA, USA, post deadline paper PDP4, Oct. 26–28, 1997.

* cited by examiner

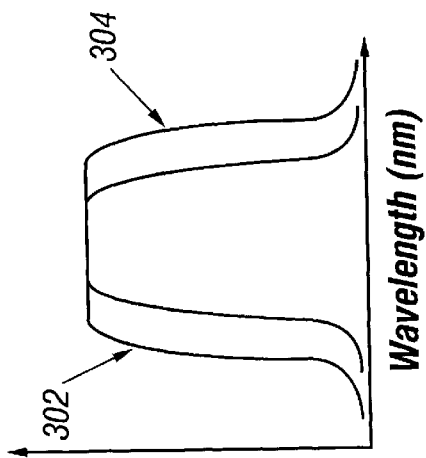
FIG. 3A
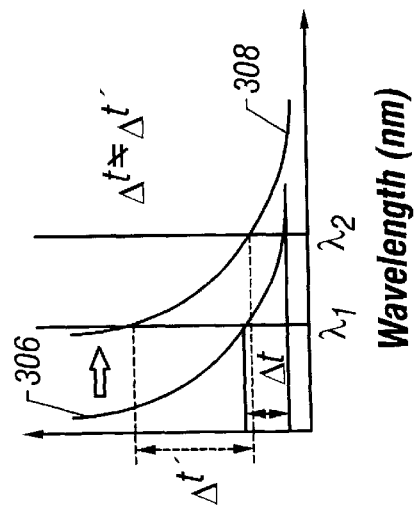
FIG. 3B
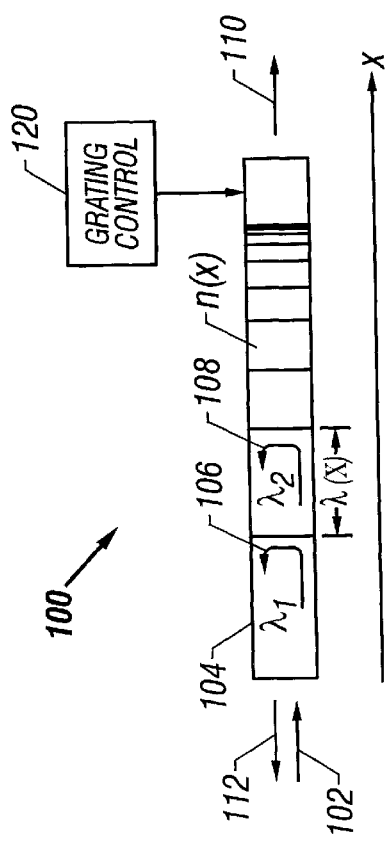
FIG. 1
FIG. 2

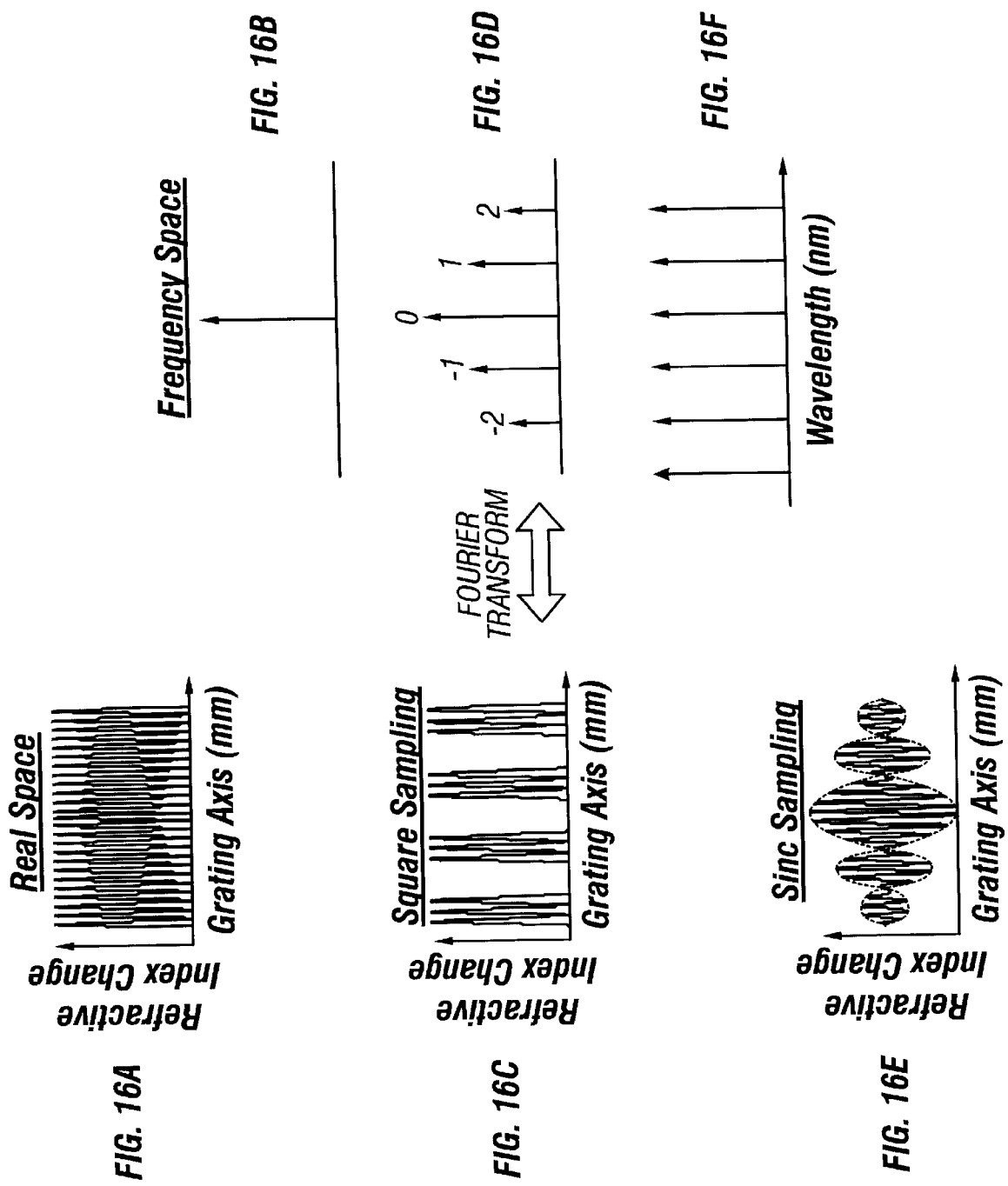

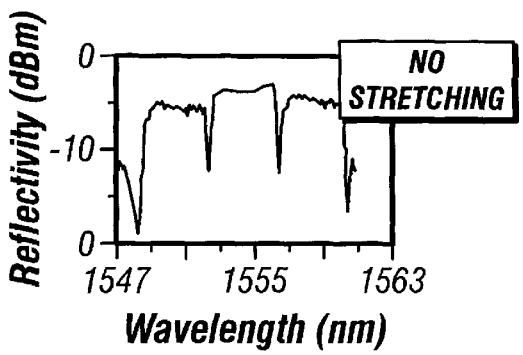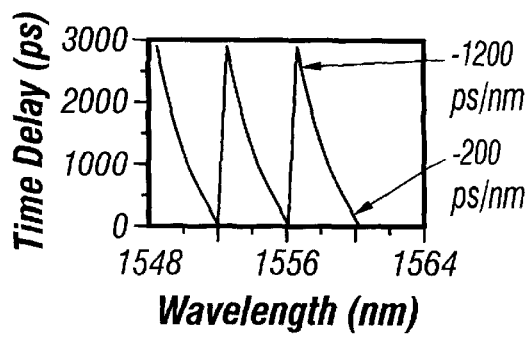
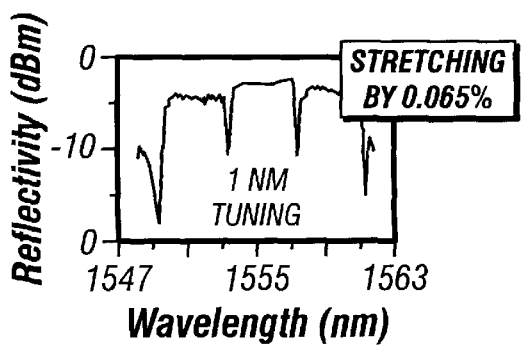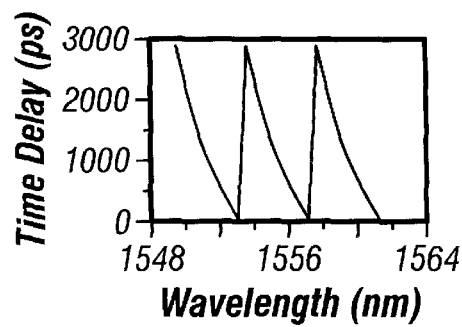
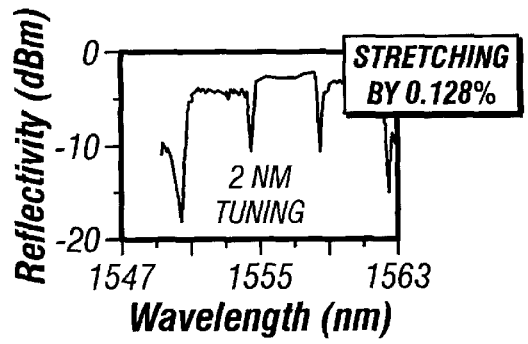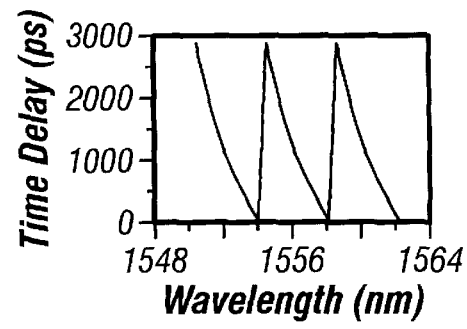
FIG. 17A    FIG. 17B
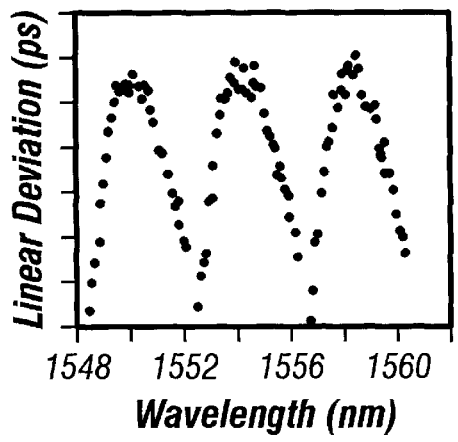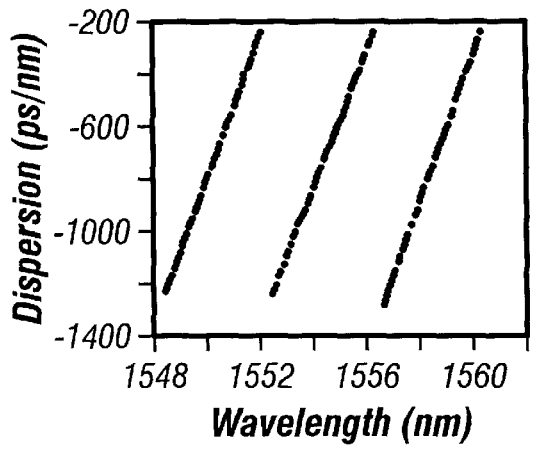
FIG. 17C    FIG. 17D

FIG. 23A
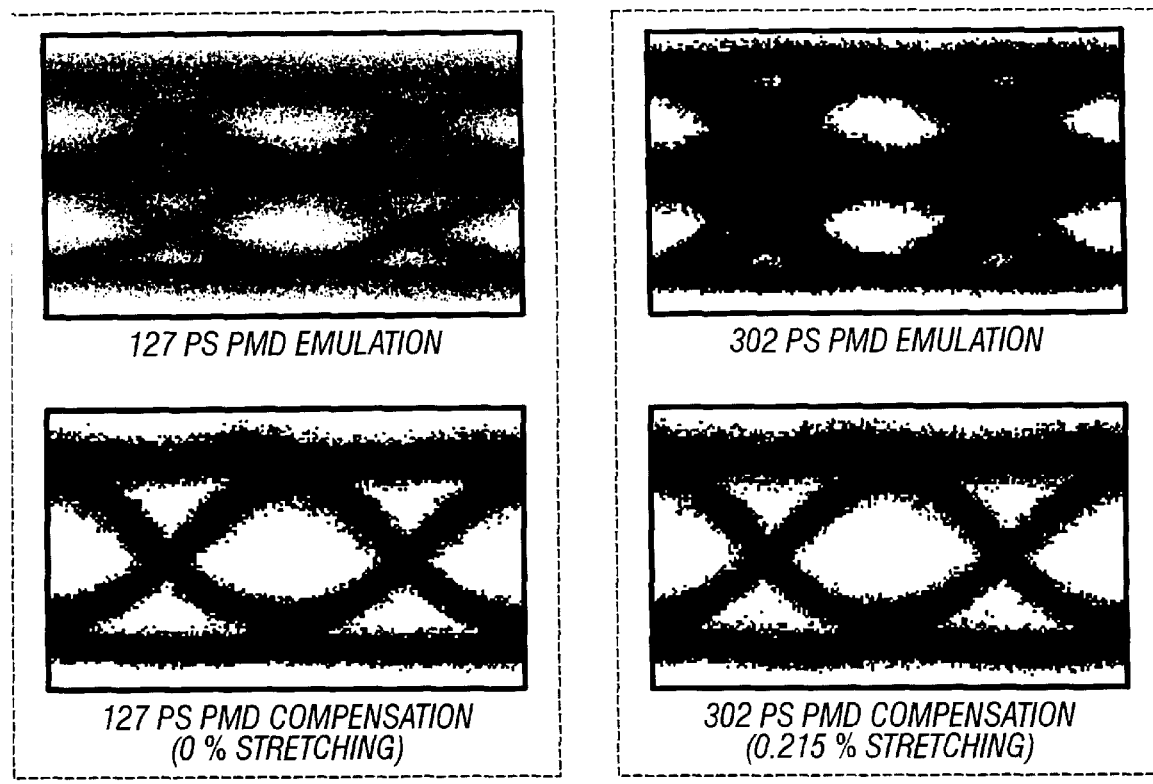
127 PS PMD EMULATION
302 PS PMD EMULATION
127 PS PMD COMPENSATION
(0 % STRETCHING)
302 PS PMD COMPENSATION
(0.215 % STRETCHING)
FIG. 23B          FIG. 23C

TUNING OF OPTICAL DISPERSION BY USING A TUNABLE FIBER BRAGG GRATING

This application is a continuation application of a copending U.S. application Ser. No. 09/253,645, filed Feb. 19, 1999, which is a continuation-in-part application of a U.S. patent application Ser. No. 09/027,345, filed on Feb. 20, 1998 and issued as U.S. Pat. No. 5,982,963 on Nov. 9, 1999 which claims the benefit of the U.S. Provisional Application No. 60/069,498, filed on Dec. 15, 1997.

FIELD OF THE INVENTION

The present invention relates to optical dispersion compensation and optical pulse manipulation, and more specifically, to devices and systems having an optical grating capable of causing wavelength-dependent delays.

BACKGROUND

Dispersion in optical waveguides such as optical fibers causes optical waves of different wavelengths to travel at different speeds. One parameter for characterizing the dispersion is group velocity which is related to the derivative of the propagation constant of an optical wave with respect to frequency. The first-order group velocity dispersion is typically expressed as a change in light propagation time over a unit length of fiber with respect to a change in light wavelength. For many fibers used in telecommunication, the first-order group velocity dispersion is on the order of 10 ps/nm/km at 1550 nm.

In many applications, an optical signal is composed of spectral components of different wavelengths. For example, a single-frequency optical carrier may be modulated in order to impose information on the carrier. Such modulation generates modulation sidebands at different frequencies from the carrier frequency. For another example, optical pulses, which are widely used in optical data processing and communication applications, contain spectral components in a certain spectral range. The dispersion effect may cause adverse effects on the signal due to the different delays on the different spectral components.

Dispersion in particular presents obstacles to increasing system data rates and transmission distances without signal repeaters in either single-channel or wavelength-division-multiplexed ("WDM") fiber communication systems. Data transmission rates up to 10 Gbit/s or higher may be needed in order to meet the increasing demand in the marketplace. Dispersion can be accumulated over distance to induce pulse broadening or spread. Two adjacent pulses in a pulse train thus may overlap with each other at a high data rate. Such pulse overlapping can cause errors in data transmission.

One way to reduce the dispersion effect in fibers is to implement a fiber grating with linearly chirped grating periods. The resonant wavelength of the fiber grating changes with the position due to the changing grating period. Therefore, different spectral components in an optical signal are reflected back at different locations and thus have different delays. Such wavelength-dependent delays can be used to reduce the accumulated dispersion in a fiber link.

SUMMARY

The present disclosure includes techniques and devices based on a wave-guiding element which has a spatial grating pattern that is an oscillatory variation along its optic axis. The wave-guiding element is configured to receive an input optical signal and to produce an output optical signal by reflection within a Bragg reflection band produced by the spatial grating pattern so as to produce time delays of different reflected spectral components as a nonlinear function of spatial positions along said optic axis at which the different reflected spectral components are respectively reflected. A control unit may be engaged to the wave-guiding element and is operable to change a property of the spatial grating pattern along the optic axis to tune at least relative time delays of the different reflected spectral components nonlinearly with respect to wavelength. The dispersion of such a wave-guiding element can be dynamically adjusted to produce a desired dispersion with desired relative delays among different spectral components in a controllable manner.

One embodiment of the above wave-guiding element is the nonlinearly-chirped grating which may include a grating that has an effective index $n_{eff}(x)$ and the grating period $\Lambda(x)$ are configured to produce a grating parameter $n_{eff}(x)\Lambda(x)$ as a nonlinear function of the position along the fiber optic axis. Such a grating reflects optical waves satisfying a Bragg condition of $\lambda(x)=2n_{eff}(x)\Lambda(x)$. A single Bragg reflection band is generated where the bandwidth is determined by the chirping range of the grating parameter $n_{eff}(x)\Lambda(x)$.

A grating tuning mechanism may be implemented by using a grating control unit to control either the effective index $n_{eff}(x)$ or the grating period $\Lambda(x)$. This allows for adjustment of the grating parameter $n_{eff}(x)\Lambda(x)$ and thus to the relative delays for signals at different wavelengths within the bandwidth of the reflection. A transducer, e.g., a piezo-electric element, may be used as the control unit to compress or stretch the overall length of the grating in order to produce a tunable dispersion profile. A magnetostrictive element may also be used to change the grating length according to an external control magnetic field. If the grating material is responsive to a spatially-varying external control field such as an electric field, an electromagnetic radiation field, or a temperature field along the grating direction, a control unit capable of producing such conditions can be used to change effective index of refraction and to produce a tunable dispersion profile.

In addition, the frequency response of a nonlinearly chirped grating may be tuned by using an acoustic wave propagating along the grating direction. The acoustic wave induces additional modulation sidebands in the frequency response of the grating. Such modulation sidebands are displaced from the baseband by a frequency spacing that is dependent on the frequency of the acoustic wave. Therefore, an adjustable dispersion can be achieved by tuning the frequency of the acoustic wave.

The present disclosure also provides a sampled nonlinearly-chirped grating for changing relative time delays of signals at different wavelengths. This sampled nonlinearly-chirped grating includes a wave-guiding element having a refractive index that varies along its optic axis according to a multiplication of a first spatial modulation and a second spatial modulation. The first spatial modulation is an oscillatory variation with a nonlinearly-chirped period along the optic axis. The second spatial modulation is a periodic modulation with a period different than the nonlinearly-changing period.

The first and second modulations effectuate first and second gratings that spatially overlap each other in the wave-guiding element along its optic axis. The first grating may be a nonlinearly-chirped grating. The second grating may have a grating period greater than the first grating. The first grating and second gratings couple with each other and operate in combination to produce a plurality of reflection bands at different wavelengths and with a bandwidth determined by the first grating.

A nonlinearly-chirped grating can be further configured to change relative time delays of two different polarization states in an optical signal. One embodiment of such a grating comprises a wave-guiding element formed of a birefringent material that exhibits different refractive indices for the two polarization states. A nonlinearly-chirped grating is formed in the wave-guiding element along its optic axis and has a varying grating period that changes as a monotonic nonlinear function of a position. The grating operates to reflect two polarization states of an input optical signal at different locations along the optic axis to cause a delay between said two polarization states.

One aspect of the nonlinearly-chirped gratings is dispersion compensation. A nonlinear chirped grating can be disposed at a fiber link to reduce the effects of the dispersion. The dispersion produced by such a grating is actively tunable to compensate for varying dispersion in a fiber link which includes a dispersion analyzer and a feedback control. This tunability can be advantageously used in a dynamic fiber network in which communication traffic patterns may change over time. For example, a given channel may be originated at different locations in the network from time to time so that the accumulated dispersion of that given channel in a specific fiber link is a variable. Therefore, the dispersion compensation required for that fiber link needs to change accordingly. Also, the operating conditions for point-to-point transmission may also change, resulting in variations in the accumulated dispersion for signals in a fixed fiber link.

Another aspects of the nonlinearly-chirp gratings include dispersion slope compensation, polarization mode dispersion, chirp reduction in directly modulated diode lasers, and optical pulse manipulation.

These and other embodiments, aspects and advantages of the invention will become more apparent in light of the following detailed description, including the accompanying drawings and appended claims.

BRIEF DESCRIPTION OF THE DRAWINGS

FIG. 1 is a diagram illustrating a nonlinear chirped grating in a wave-guiding element.

FIG. 2 is a diagram showing a grating having a nonlinearly chirped grating period.

FIG. 3A is a chart showing shift of reflective spectrum of a nonlinearly chirped fiber grating due to fiber stretching.

FIG. 3B is a chart showing relative time delay of reflected signals at two different wavelengths due to fiber stretching.

FIGS. 16A and 16B show a periodic modulation on the refractive index n(x) with a constant effective refractive index in a fiber grating and the associated Bragg reflection peak in the frequency space.

FIGS. 16C, 16D, 16E, and 16F illustrate multiple reflection spectral windows generated by modulating the refractive index n(x) to produce two sets of gratings in two different modulation schemes.

FIGS. 17A and 17B show measured shifts of the reflected spectrum and the grating-induced time delay curves, respectively, for an exemplary three-channel sampled nonlinearly-chirped fiber grating under different stretching conditions.

FIGS. 17C and 17D are plots of the deviation of the grating-induced nonlinear time delay from a linear time delay and the dispersion as a function of wavelength for the same three-channel sampled nonlinearly-chirped fiber grating of FIGS. 17A and 17B.

FIGS. 23A, 23B, and 23C show the base-line eye diagram, the eye diagrams for the 127-ps PMD emulation with and without dispersion compensation, the eye diagrams for the 302-ps PMD emulation without and with compensation that are measured from a PMD emulation apparatus by using a birefringent nonlinearly-chirped fiber grating.

DETAILED DESCRIPTION

Figure 4:
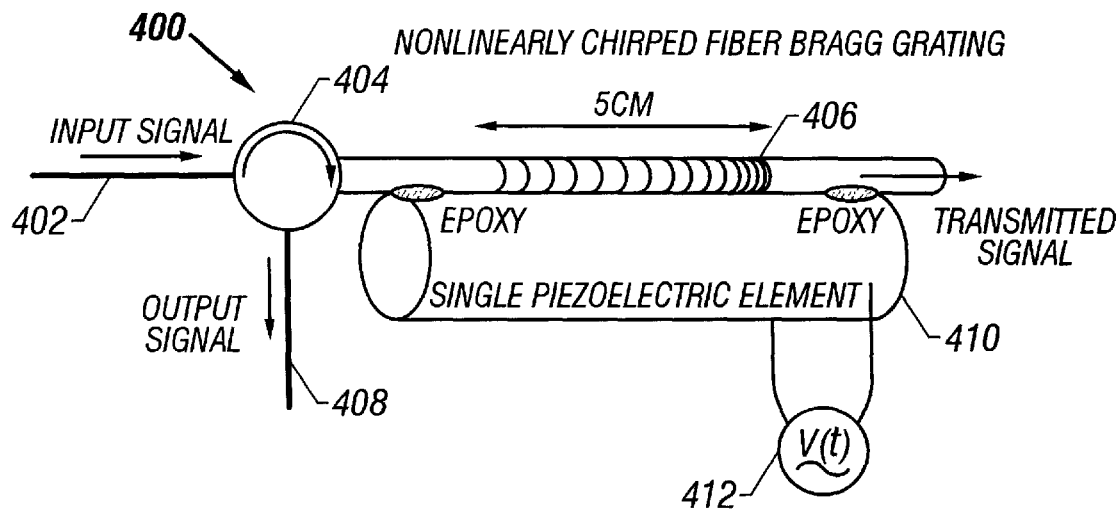
FIG. 4 is a diagram of one implementation of the system in FIG. 2 using a piezoelectric element.

FIG. 1 shows a nonlinearly chirped grating 100 in accordance with one embodiment of the disclosure. The grating 100 is formed of an optical wave-guiding element 104 such as a fiber or waveguide. The grating period, $\Lambda(x)$, and the effective index of refraction in the grating, $n_{eff}(x)$, are at least partly dependent on the position, x, along the wave-guiding element 104. The grating is effected by a modulation on the refractive index n(x) of the wave-guiding element. The effective index $n_{eff}(x)$ is a spatial average of n(x) and can be either a constant value or a function of the position x depending on the n(x). An input optical signal 102 enters the grating 104 at a nearly normal incidence to produce a reflected signal 112 and a transmitted signal 110.

A spectral component of a wavelength $\lambda$ in the input optical signal 102 is reflected back at position x when the wavelength $\lambda$, the grating period $\Lambda(x)$, and the effective index of refraction $n_{eff}(x)$ satisfy a Bragg phase-matching condition:

$$2n_{eff}(x)\Lambda(x)=\lambda.$$

Therefore, the wavelength $\lambda$ of the reflected wave varies with the position x according to the grating parameter $n_{eff}(x)\Lambda(x)$. Different spectral components of different wavelengths, e.g., the reflection 106 at $\lambda_1$ and the reflection 108 at $\lambda_2$, are reflected at different locations and have different phase delays. For example, when the grating parameter $n_{eff}(x)\Lambda(x)$ increases with x, spectral components at short wavelengths satisfying the phase-matching condition are reflected back at locations before the components at long wavelengths. A spectral component in the input signal 102 that does not meet the above Bragg phase-matching condition transmits through the wave-guiding element 104 as indicated by a signal 110. The grating parameter $n_{eff}(x)\Lambda(x)$ determines the spectral range of the reflected signal from the grating 100. This forms the basis of dispersion compensation and pulse shaping.

The grating 100 is generally configured to have a non-linearly chirped grating parameter $n_{eff}(x)\Lambda(x)$ i.e., $n_{eff}(x)\Lambda(x)$ changes nonlinearly with the position x. This may be achieved by a nonlinearly chirped $n_{eff}(x)$, $\Lambda(x)$ or a combination of both.

The grating 100 can be adjusted to change the reflection spectrum and the relative delays in the different reflected spectral components. A grating control 120 is implemented to control the grating parameter $n_{eff}(x)\Lambda(x)$ by varying at least one of $n_{eff}(x)$ and $\Lambda(x)$ of the grating 100. This provides a dynamically tunable reflection spectral range and relative delays of different reflected spectral components.

FIG. 2 shows one implementation 200 of the nonlinearly chirped grating 100. A fiber grating 204 has a constant effective index of refraction $n_{eff}(x)=n$ and a nonlinearly chirped grating period $\Lambda(x)$. Thus, a phase-matched wavelength changes with the position x according to $\Lambda(x)$ only. A fiber stretcher 220 is engaged to the fiber grating 204 to change the overall length of the grating 204. This provides a control in the reflection spectrum and the relative delays in different spectral components.

When the fiber grating 204 is stretched, each grating pitch increases. Accordingly, a phase-matched wavelength at each grating position increases. Therefore, the reflection spectrum shifts towards longer wavelengths. This effect is illustrated in FIG. 3A in which curves 302 and 304 respectively represent the reflection spectral profiles before and after the fiber stretching.

Since the grating period $\Lambda(x)$ is nonlinearly chirped, the delay of the reflected spectral components also has a non-linear dependence on the position x. In addition, a change in the overall fiber length produces different changes in $\Lambda(x)$ at different positions along the fiber grating 204. This produces different relative delays for different wavelengths that satisfy the Bragg phase-matching condition. Such an effect can be used to produce tunable dispersion compensation profiles.

FIG. 3B is a chart of the relative time delays of two wavelengths before and after the fiber stretching. Curve 306 represents the time delay as a function of wavelength before the fiber stretching. Two different wavelengths $\lambda_1$ and $\lambda_2$ have a relative time delay $\Delta t$ with respect to each other. After the fiber grating is stretched, the time delays of both wavelengths increase (curve 308) and the relative time delay $\Delta t'$ is in general different from $\Delta t$. In the example shown, the relative time delay $\Delta t'$ increases.

Referring to FIG. 2, any device capable of stretching the grating 204 may be used as the stretcher 220. For example, a piezoelectric element or a magnetostrictive element may be used to produce a control over the length of the grating 204 according to an external electrical voltage or a magnetic field. Piezoelectric and magnetostrictive transducers are well known and will not be described here.

A technique of using a magnetostrictive rod to stretch a fiber in a non-uniform magnetic field is disclosed by Cruz et al. in "Fibre Bragg gratings tuned and chirped using magnetic fields," Electronics Letters, Vol. 33(3), pp. 235–236 (1997), which is incorporated herein by reference. This technique can be used in the embodiment 200 of FIG. 2 to adjust the grating length. In particular, since the fiber grating 204 is nonlinearly chirped, a uniform magnetic field, rather than a gradient magnetic field, can be used to uniformly stretch the fiber grating 204 for tuning the dispersion response.

FIG. 4 shows an implementation of the embodiment 200 by using a piezoelectric element. Two ends of a piezo element 410 are respectively fixed at two sides of a nonlinearly chirped fiber grating 406 by, for example, using an adhesive such as epoxy. A voltage source 412 supplies a control voltage to the piezo element 410 to change the length of the piezo which in turn couples the strain to the fiber grating 204. An optical circulator 404 is used to couple an input optical signal 402 to the fiber grating 406 and to route the reflected signal 408. An optional optical isolator may be placed at the other end of the fiber grating 406 to reject any optical feedback signal.

The nonlinearly-chirped fiber grating 204 may be made by a near-UV technology that uses an interference pattern produced by a phase mask with a light beam at 300 nm. The absorption of light in the fiber core at the wavelength of 300 nm is sufficiently small to avoid damage to the core-cladding interface in the fiber. A photosensitive fiber (e.g., the type manufactured by QPS Technology) is first soaked in a high-pressure molecular hydrogen chamber under about 250 atm pressure at ~60° C. for approximately 2 days to give the core an estimated hydrogen concentration of about 2.5 mol. %.

Figure 5:
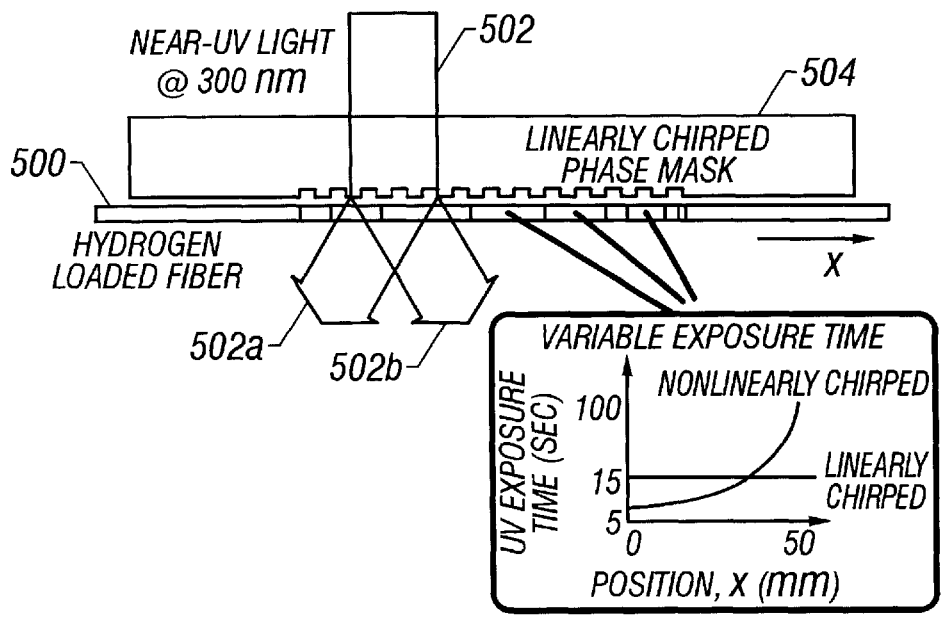
FIG. 5 is a schematic illustration of one approach to form a nonlinearly chirped grating in a photosensitive fiber.

FIG. 5 illustrates the formation of the nonlinearly-chirped grating 204 in a hydrogen-loaded photosensitive fiber 500. A light beam 502 from a UV argon laser operating on a group of spectral lines near 300 nm is focused through a 50-mm long linearly-chirped phase mask 504 onto the fiber core at an intensity of about 200 W/cm$^2$. Two first-order diffraction beams 502a and 502b interfere with each other to form an interference pattern in the immediate vicinity of the phase mask 504 where the fiber core is located. Each 1-mm spot on the fiber 500 is exposed for time periods ranging from 5 to 100 sec. After each exposure, the fiber 500 and mask 504 are translated by 1 mm relative to the UV light beam 502 and the process is repeated. The variable exposure time induces the nonlinear chirp as shown in the insert of FIG. 5.

Figure 6A:
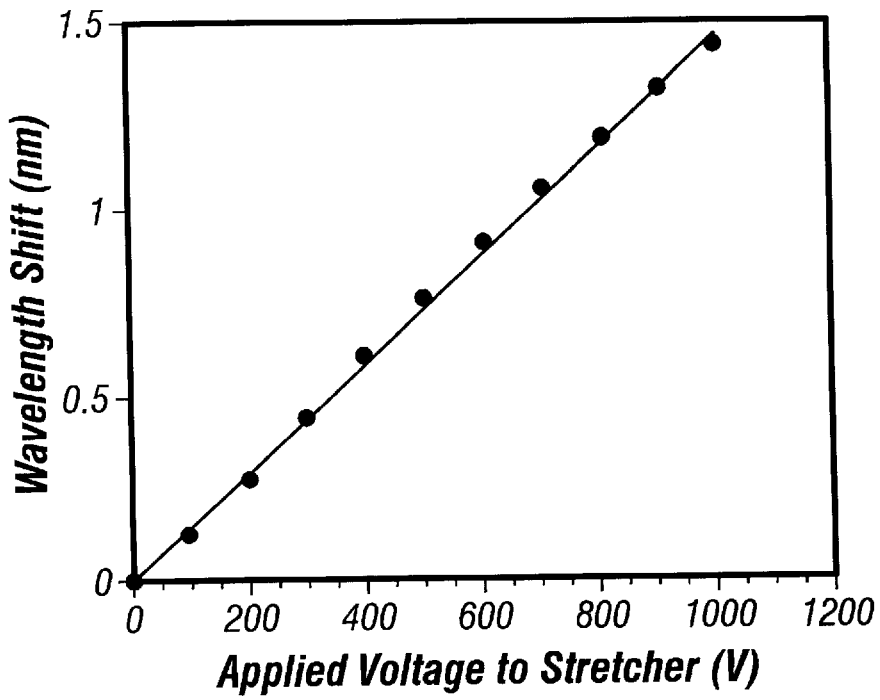
FIG. 6A is a chart showing measured wavelength shift in the reflected signals due to fiber stretching in the system of FIG. 4.
Figure 6B:
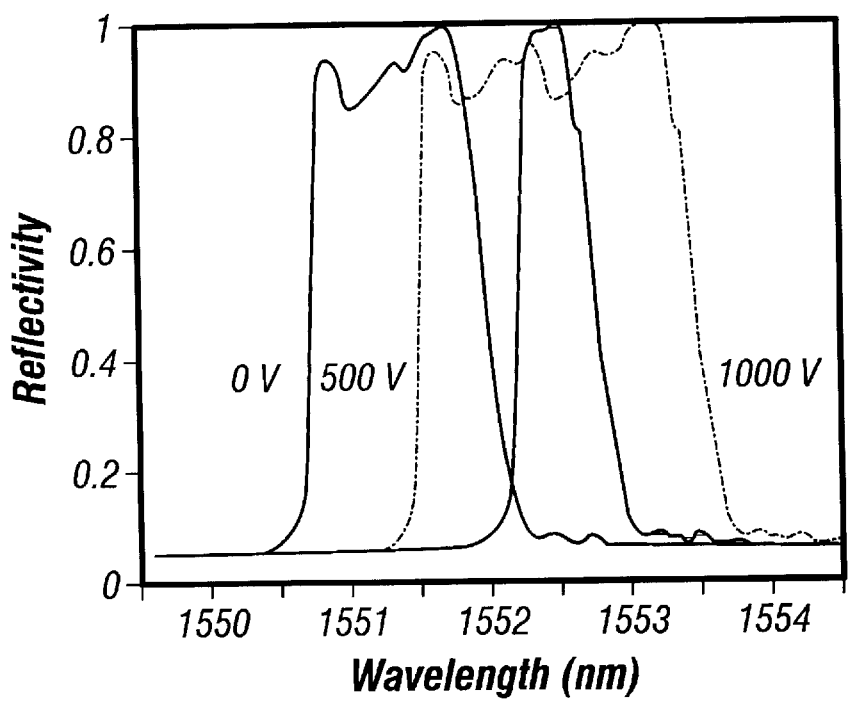
FIG. 6B is a chart showing measured shift of the reflection spectrum in the system of FIG. 4.

FIG. 6A shows the measured wavelength shift in the reflected signal 408 as a function of the control voltage applied to the piezo element 410. FIG. 6B shows the reflection spectrum shifts due to fiber stretching for voltages on the piezo element 410 at 500 V and 1000 V, respectively. When a control voltage of about 1000 V is applied to the piezo element 410, the reflected band is shifted by about 1.5 nm, and the wavelength shift is linear with respect to the voltage. The bandwidth is about 1 nm and the reflectivity varies from 85% to 100%, i.e. by approximately 0.7 dB. The dispersion varies nonlinearly and smoothly from 300 ps/nm to 1000 ps/nm. While increasing the applied voltages, the time delay curves shift to longer wavelengths without distorting the smooth shape. Therefore, for a given transmitted channel wavelength, the channel will encounter a different dispersion compensation corresponding to different stretching of the nonlinearly-chirped fiber grating.

Figure 6C:
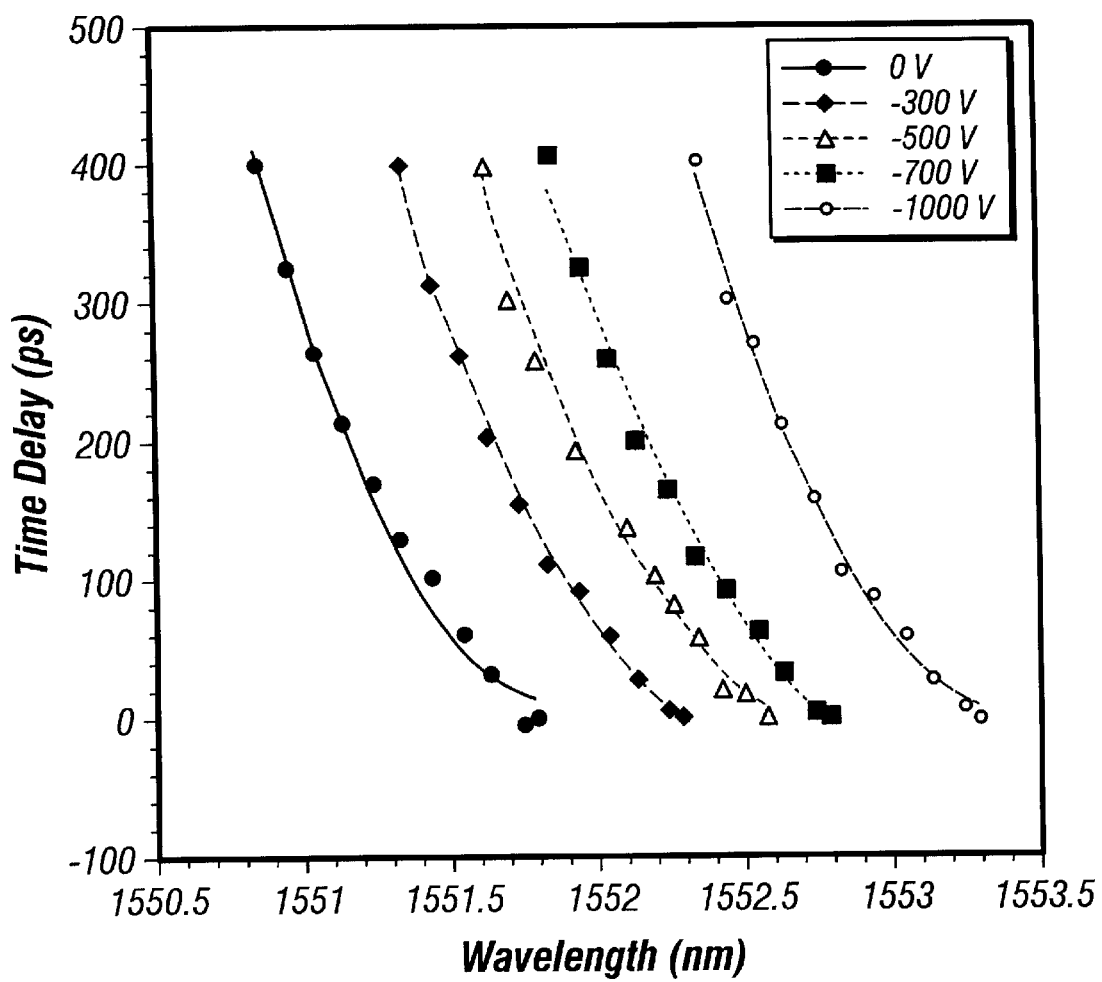
FIG. 6C is a chart showing nonlinear time delays of reflected signals as a function of wavelengths that are measured in the fiber grating of FIG. 4.

FIG. 6C further shows measured nonlinear time delays of reflected signals as a function of wavelengths when the fiber grating is stretched by different amounts under different control voltages.

Figure 6D:
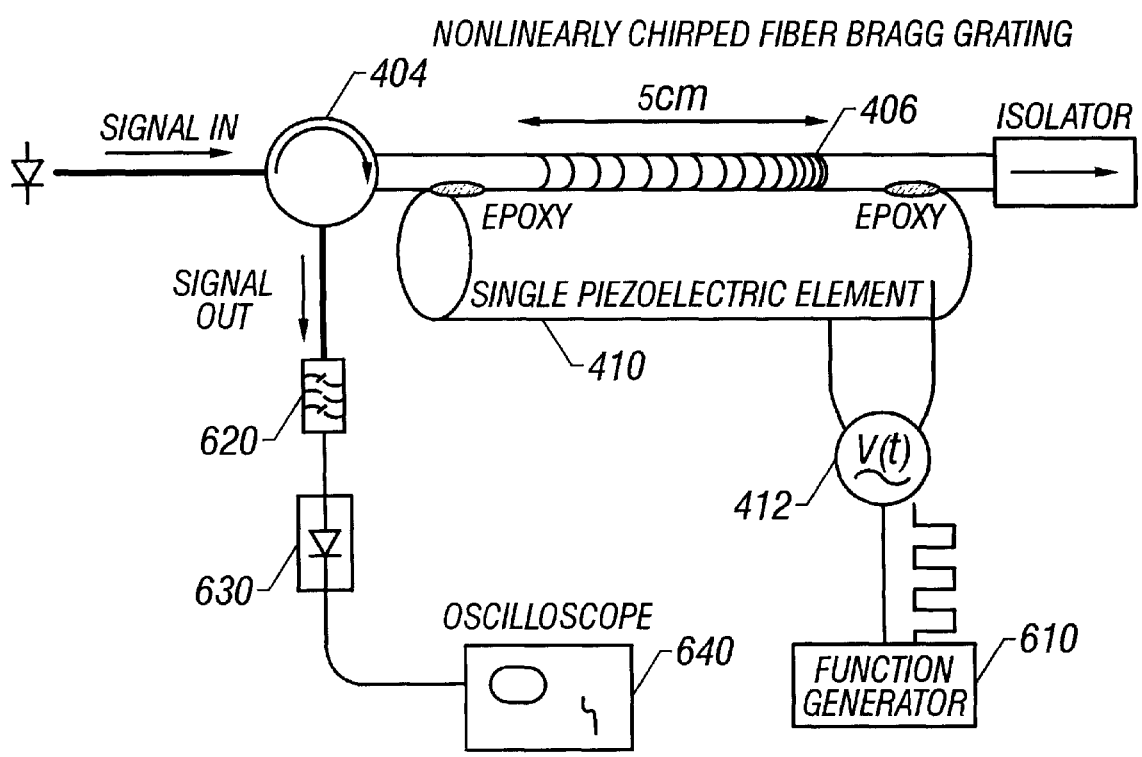
FIG. 6D is a diagram of a modulated nonlinearly chirped fiber grating.

The length of the piezoelectric element 410 can be modulated to provide dispersion switching. FIG. 6D shows a system using the fiber grating 400 to produce a signal with a modulated dispersion. A modulation signal generator 610 modulates the piezo control 412 so that the length of the fiber grating 406 is modulated. A bandpass interference filter 620 with a bandwidth of 0.3 nm is used to filter the reflected output from the fiber grating 406. A photodetector 630 receives the transmitted signal from the filter 620. An oscilloscope 640 receives and displays the time response of the signal from the photodetector 630.

Figure 6E:
FIG. 6E is a chart showing a modulated voltage signal used in FIG. 6D.
Figure 6F:
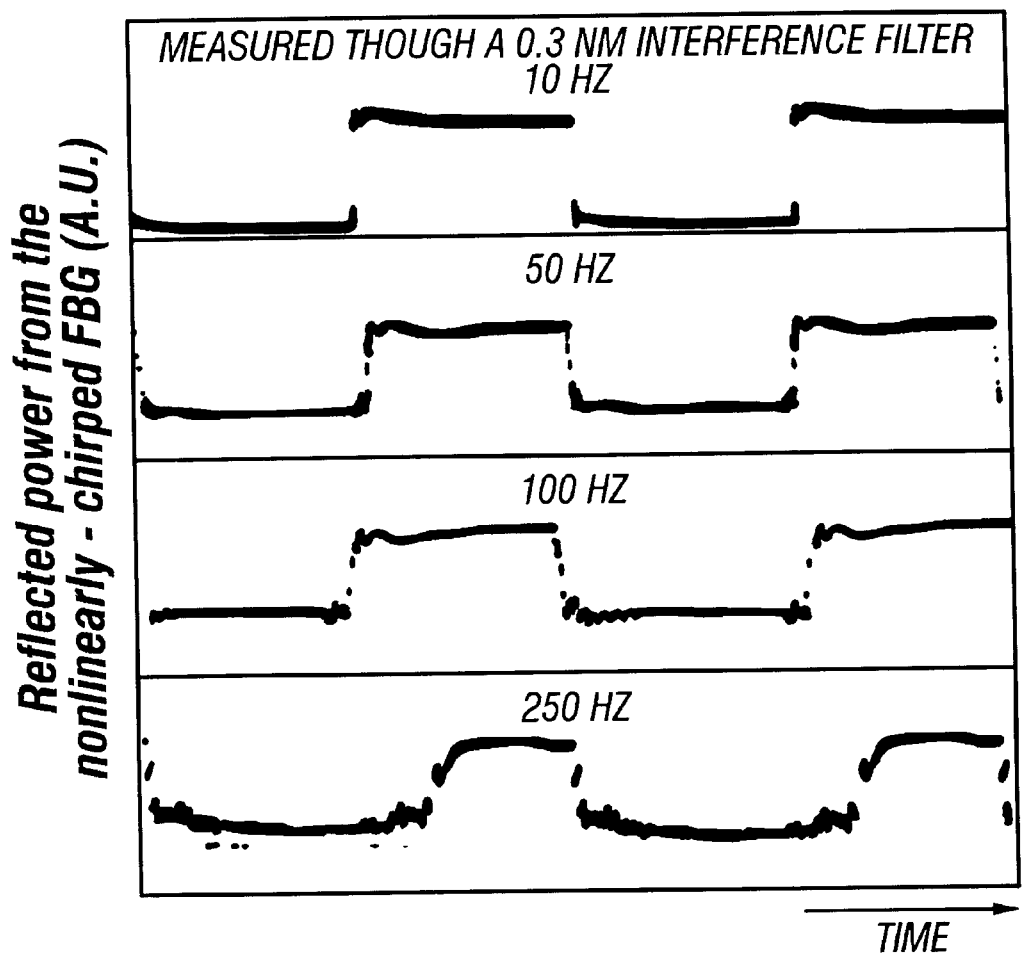
FIG. 6F is a chart showing reflected output signals as a function of time at different modulation frequencies.

FIG. 6E shows the modulated control voltage applied to the piezo element 410. Measurements at modulation frequencies at 10 Hz, 50 Hz, 100 Hz, and 250 Hz are shown in FIG. 6F. The piezoelectric element 410 may be modulated up to about 100 Hz using 0–500 Volts modulation. The upper limit of the frequency response is limited by the characteristics of the PZT. With this dynamic response, dispersion compensation in less than 10 ms can be achieved in circuit-switched optical networks.

Figure 7:
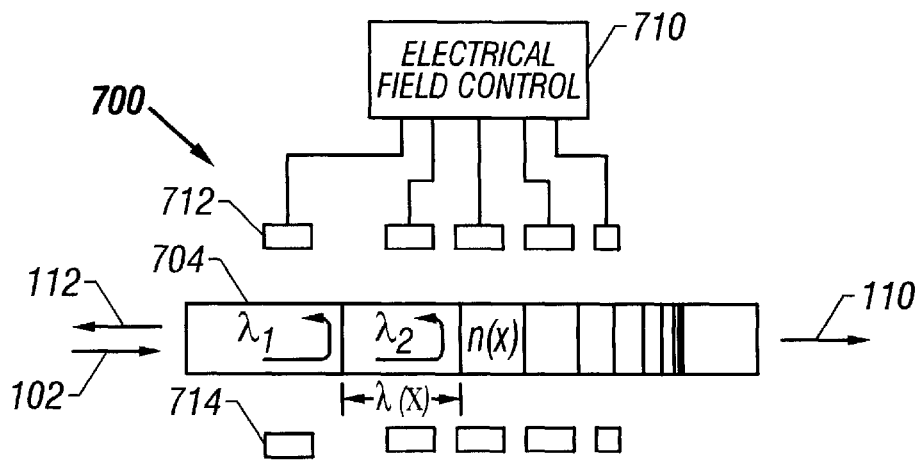
FIG. 7 is a diagram showing a nonlinearly chirped grating based on electro-optic effects.

The nonlinearly chirped grating 100 in FIG. 1 can also be implemented by using a wave-guiding element that has an index of refraction dependent on an external electrical field. One example of such wave-guiding element is a dielectric waveguide or fiber exhibiting electro-optic effects. LiNbO$_3$ is a commonly used electro-optic material. FIG. 7 shows a grating 700 with a nonlinearly chirped grating period in such a wave-guiding element 704. The effective index of refraction $n_{eff}(x)$ of the wave-guiding element 704 varies with an electrical field. A series of pairs of electrodes 712, 714 are disposed along the wave-guiding element 704 to produce adjustable local fields. An electrical-field control module 710 controls the spatial variation of the field to produce a desired nonlinear chirped $n_{eff}(x)$ and to adjust the dispersion.

Figure 8:
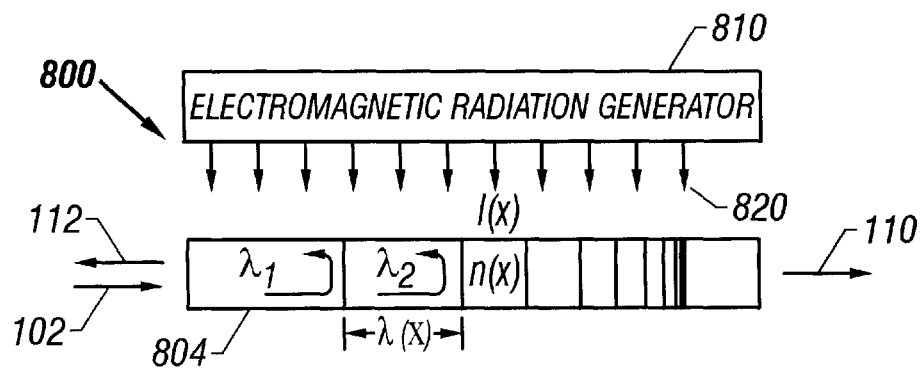
FIG. 8 is a diagram showing a photosensitive nonlinearly chirped grating.

FIG. 8 shows another embodiment 800 that uses an electromagnetic radiation to control the spatial variation of the effective index $n_{eff}(x)$ of a wave-guiding element 804. The wave-guiding element 804 responds to the radiation field 820 and has a field-dependent effective index $n_{eff}(x)$. For example, photosensitive materials such photorefractive crystals and polymers may be used to implement the present invention. The nonlinear chirping of the effective index $n_{eff}(x)$ is formed by applying an electromagnetic radiation field 820 with a nonlinear intensity distribution along the grating. A radiation generator 810 is configured to control the intensity variation I(x) of the field 820. In the optical frequency range, the radiation generator 810 may be a laser.

Figure 9:
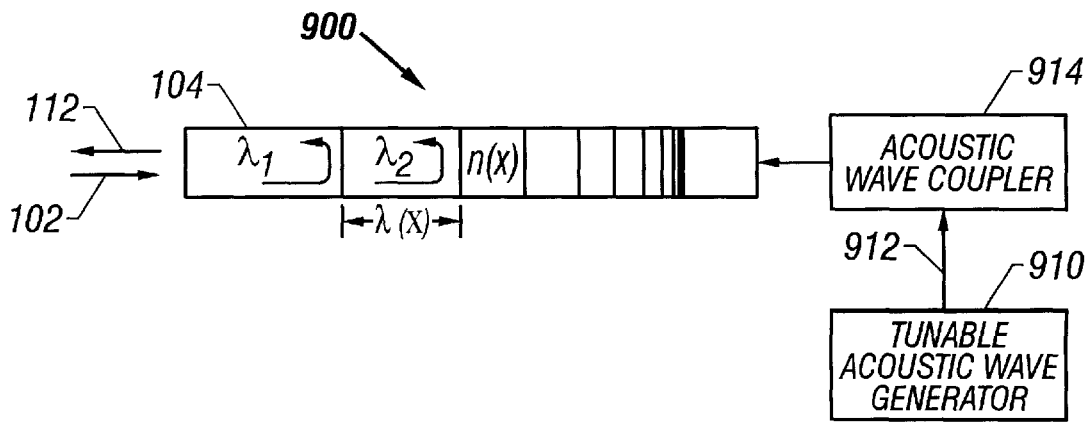
FIG. 9 is a diagram showing a nonlinearly chirped grating having an acoustic tuning element.

It is further contemplated that an acoustic wave can be used to modulate the response of any of the above nonlinearly chirped gratings for tuning the output frequency. FIG. 9 shows a nonlinearly chirped grating 900 with such an acoustic tuning mechanism. An acoustic wave generator 910 produces a tunable acoustic wave 912. An acoustic wave coupler 914, such as an acoustic focusing horn, couples the acoustic wave into the grating 104.

In operation, the acoustic wave interacts with the grating and induces two additional narrow-band peaks on either side of the base band produced by the Bragg resonance condition. The frequency components in either sideband has the same relative delays as in the baseband but are shifted from the baseband in frequency by a specified amount. This frequency shift is dependent on the frequency of the acoustic wave. Thus, the frequency of a sideband is adjustable by changing the frequency of the acoustic wave. Liu et al. disclose such a technique in "Improved Efficiency Narrow-Band Acoustooptic Tunable Reflector using Fibre Bragg grating," post deadline paper PD4, Annual Meeting of Optical Society of America, "Bragg Gratings, Photosensitivity, and Poling in Glass Fibers and Waveguides: Applications and Fundamentals," Oct. 26–28, 1997, Williamsburg, Va., which is incorporated herein by reference.

The nonlinearly chirped fiber gratings in accordance with this embodiment are tunable in two aspects. First, the frequency profile of the reflected and the transmitted signals can be shifted as desired. Second, the relative delays of different frequency components in an input pulse can be adjusted in a controllable manner. The first aspect of tunability is useful in multi-wavelength photonic systems such as wavelength-division multiplexed fiber communications systems. The second aspect of the tunability can be used for dynamic dispersion compensation in many dispersive optical systems, especially in fiber communication systems.

Figure 10A:
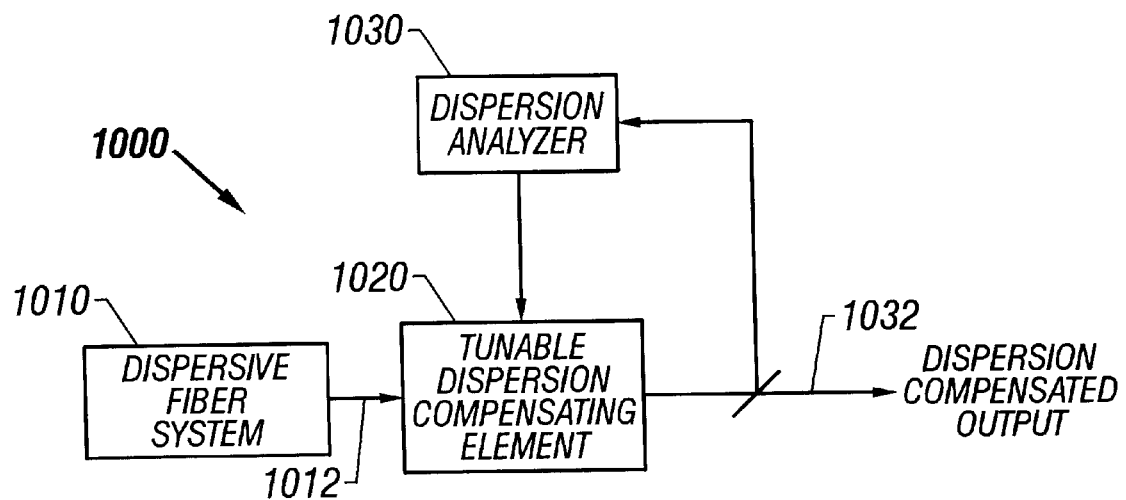
FIGS. 10A and 10B are block diagrams of two dynamically adjustable dispersion compensation systems.

FIG. 10A shows a fiber system 1000 having a tunable dispersion-compensating element 1020 in accordance with one embodiment of the invention. The tunable dispersion element 1020 may be a nonlinearly chirped grating. A dispersive fiber system 1010 produces an optical signal 1012 with a certain amount of dispersion. A dispersion analyzer 1030 measures the amount and the sign of the accumulated dispersion in the output signal from the tunable dispersion compensating element 1020. The tunable dispersion-compensating element 1020 uses this information to adjust the dispersion compensation of the element 1020 in such a way that the dispersion in the signal 112 is compensated. As the dispersion in the dispersive fiber system 1010 changes, the tunable dispersion-compensating element 1020 adjusts accordingly in response to the dispersion change to maintain the desired dispersion compensation in output 1032.

Figure 10B:
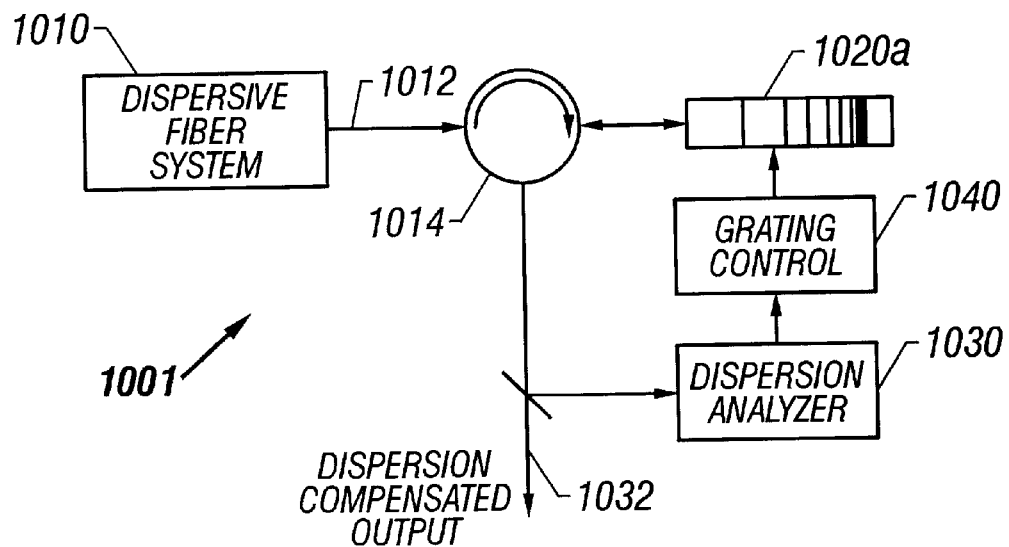

FIG. 10B is a block diagram for a fiber communication system 1001 that uses a nonlinearly chirped fiber grating 1020*a* to implement the system 1000 in FIG. 10A. A grating control 1040 adjusts the grating parameter $n_{eff}(x)\Lambda(x)$ in accordance with the control command from the dispersion analyzer 1030 to maintain the output 1032 properly compensated. The grating control 1040 may be any or a combination of the techniques shown in FIGS. 2, 7, and 8.

Figure 10C:
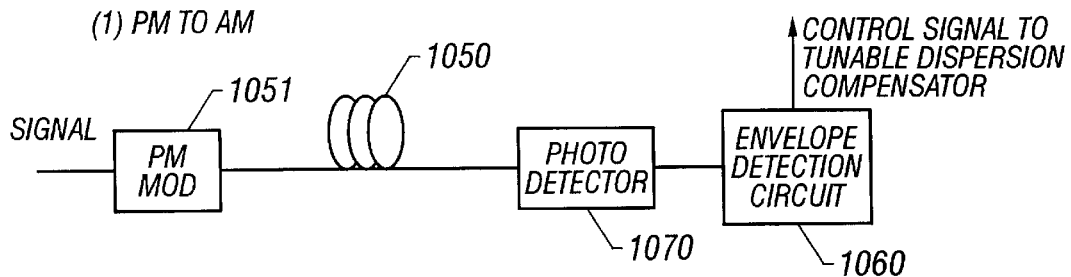
FIGS. 10C, 10D, and 10E are diagrams showing three exemplary implementations of the dispersion analyzer in FIGS. 10A and 10B.

The dispersion analyzer 1030 may be implemented in a number of ways. FIG. 10C shows a phase modulation to amplitude modulation dispersion detector. A phase modulator 1051 is disposed in the signal path to modulate the phase of the signal prior to transmission through a dispersive fiber 1050. An envelop detection circuit 1060 measures the converted amplitude modulation, whose amplitude corresponds to the relative accumulated dispersion, in the received signal by a photodetector 1070. More specifically, the polarity of dispersion can be detected by including the total dispersion of the group velocity dispersion in the fiber and the self-phase modulation caused by the fiber nonlinearity. See, Tomizawa et. al, "Nonlinear influence on PM-AM conversion measurement of group velocity dispersion in optical fiber," Electronics Letters, Vol. 30(17), pp. 1434–1435 (1994). The amplitude of the converted amplitude modulation is then used to determine the accumulated dispersion and to generate a control signal to the tunable dispersion compensation element.

Figure 10D:
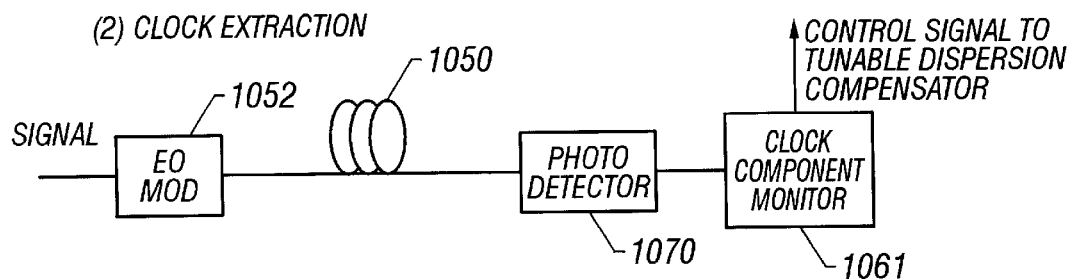

FIG. 10D shows another implementation of the dispersion analyzer 1030. An electro-optic modulator 1052 is disposed in the signal path to modulate the amplitude of the signal prior to transmission through the dispersive fiber 1050. The relative dispersion value can be determined by monitoring the amplitude of the clock component extracted from the signal after a square wave detection. This is done by a clock component monitor 1061. Since the dispersion broadens the signal pulses and reduces the amplitude of the signal, the magnitude of the clock component also decreases according to the broadening. Therefore, by adjusting the dispersion compensator to maximize the amplitude of the clock amplitude, the accumulated dispersion can be reduced or canceled.

Figure 10E:
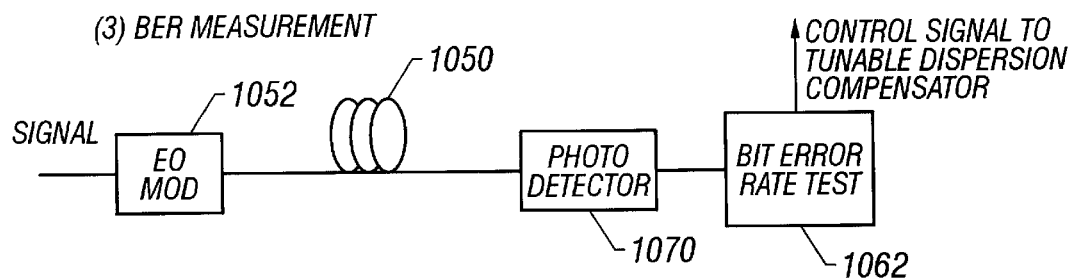

The dispersion analyzer 1030 can further be implemented by directly measuring the bit error rate of the signal passing through a dispersive fiber. This is shown in FIG. 10E. Since the dispersion can broaden the data pulses, the bit error rate ("BER") is degraded. A bit error rate testing device 1062 measures the bit error rate and extracts a relative information of the accumulated dispersion. With a feedback signal to the tunable dispersion compensator, the dispersion compensation can be adjusted to reduce or minimize the bit error rate.

Figure 11A:
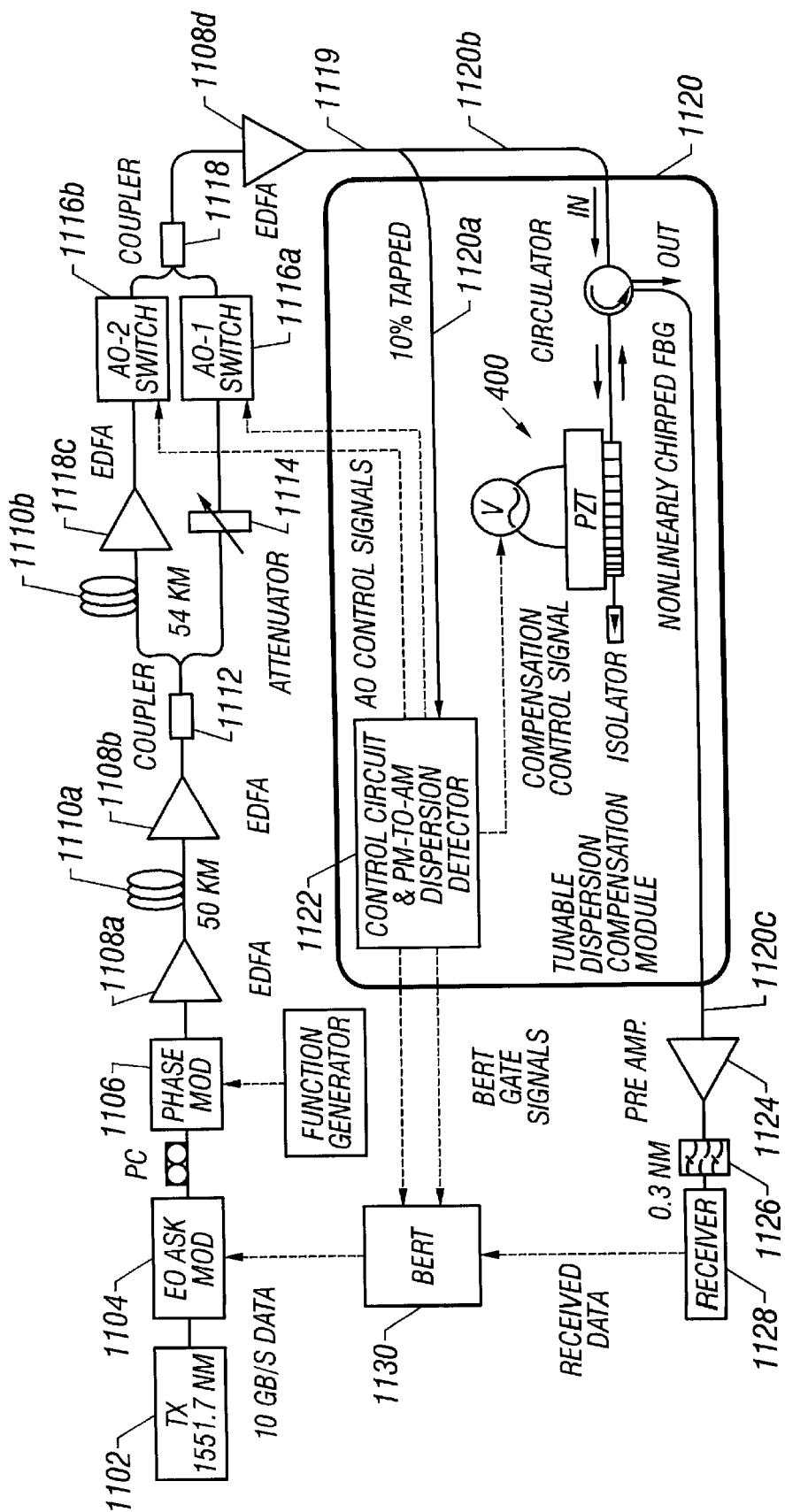
FIG. 11A is a block diagram of a fiber communication system based on the configuration in FIG. 10B using a nonlinearly chirped fiber grating.

FIG. 11A further shows a specific implementation of the dynamic fiber system 1100 in FIG. 10B. An electro-optic modulator 1104 imposes data on a laser beam generated by a laser 1102 with a data rate at 10 Gbit/s. In addition, a phase modulator 1106 modulates the phase of the optical signal prior to transmission. A tunable dispersion compensator 1120 based on a nonlinearly chirped fiber grating 400 as in FIG. 4 is implemented to perform the dispersion compensation. An optical coupler 1112 splits the signal into to different optical paths. The signal path passing through the fiber loops 1110*a*, 1110*b* and acoustooptic switch 1116*b* is more dispersive than the signal path passing through the fiber loop 1110*a*, the optical attenuator 1114, and the acoustooptic switch 1116*a*. Er-doped fiber amplifiers 1108*a*, 1108*b*, 1108*c*, and 1108*d* are used to maintain the signal strength above a specified level. The dispersion in the signal 1119 is detected by a dispersion analyzer 1122 by splitting a small portion 1120*a* of the signal 1119 (e.g., 10%). The majority 1120*b* of the signal 1119 is fed to the fiber grating 400 which produces a dispersion-compensated output 1120*c*. An EDFA 1124 is used to amplify the output 1120*c*. An optical receiver 1128 detects the amplified signal 1120*c* to produce the received data.

The dispersion analyzer 1122 uses a PM-to-AM converter for measuring the dispersion. Due to the different group velocity dispersions of the different spectral components in the signal, the phase modulation is converted to amplitude modulation after the signal has traveled through a certain distance of fiber path. The accumulated dispersion is measured by the dispersion analyzer 1122. The dispersion analyzer 1122 further generates a corresponding control signal to the tunable fiber grating 400.

A bit error rate test 1130 is used to measure the bit error rate for evaluating the performance of the dispersion compensation module 1120. The output 1120*c* from the module 1120 is amplified and filtered by a bandpass filter 1126 with a bandwidth of 0.3 nm.

Figure 11B:
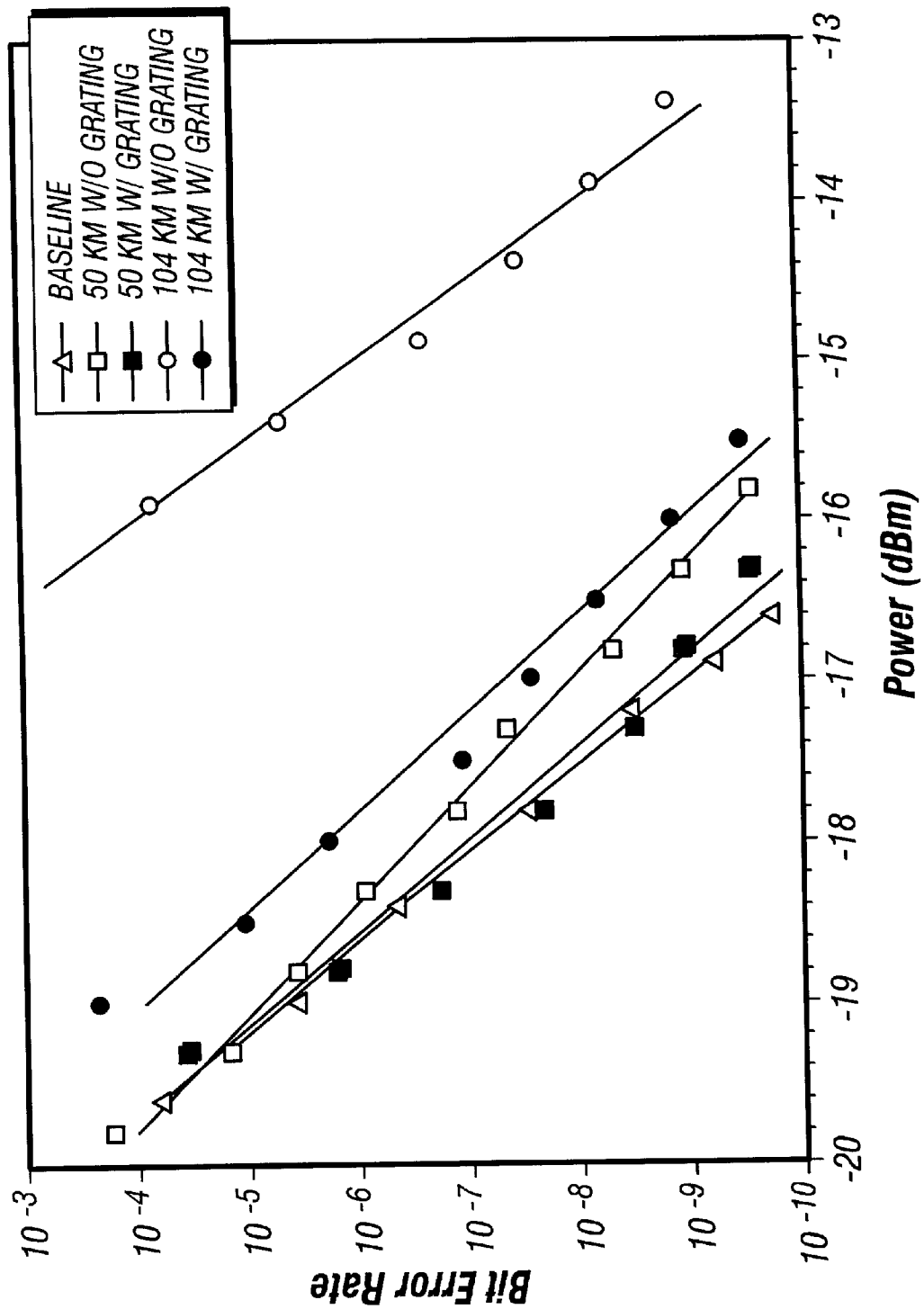
FIGS. 11B, 11C, and 11D are charts showing measured results of the system in FIG. 11A.
Figure 11C:
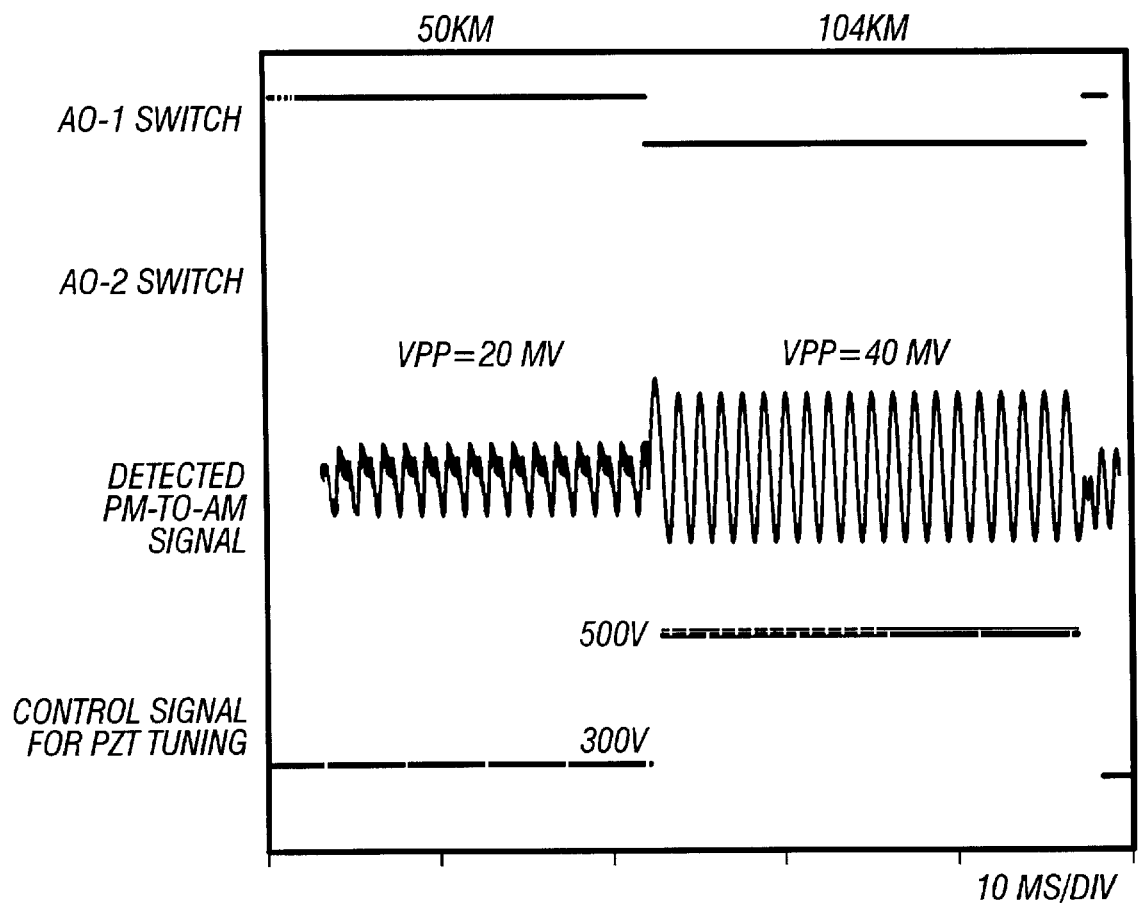
Figure 11D:
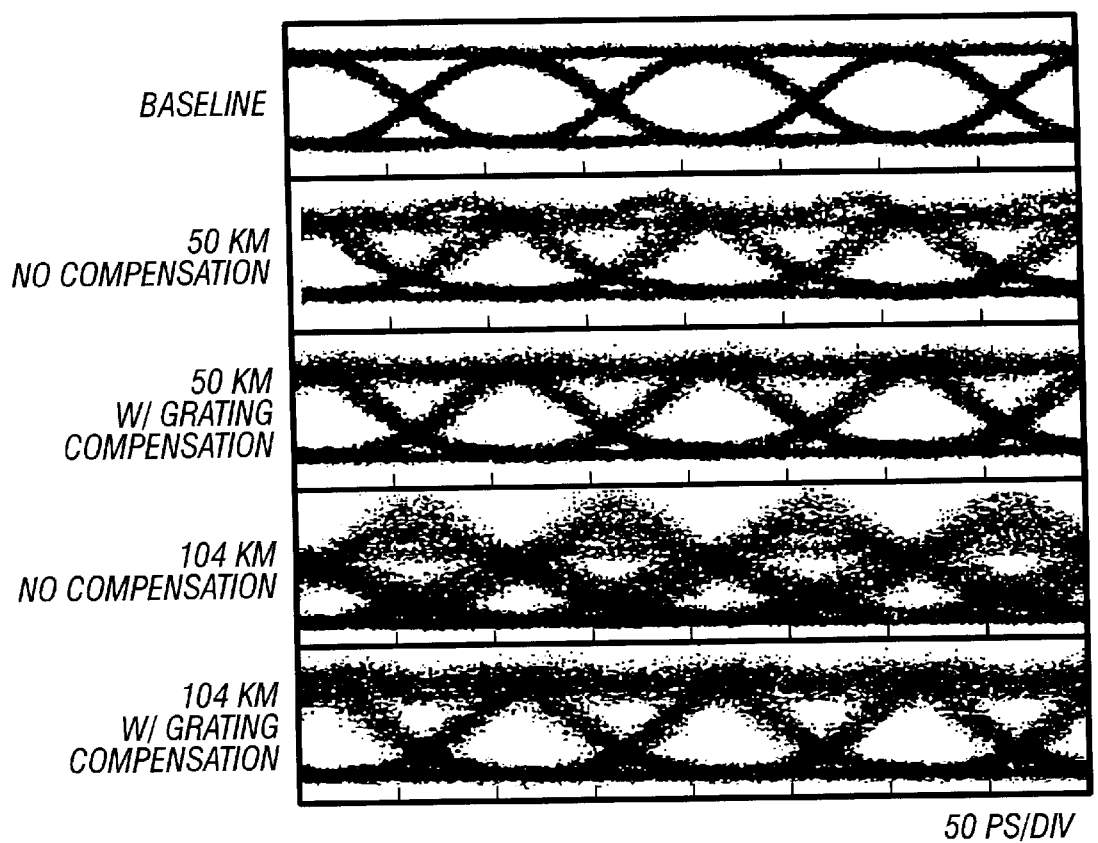

FIG. 11B shows measured results of the bit error rate as a function of the signal power in dBm. FIG. 11C shows how the control signal for the PZT tuning is generated in response to the dispersion levels of the input signals. FIG. 11D shows the measured eye diagrams indicating the significant improvements in the BER due to the dynamic dispersion compensation.

The above described nonlinearly chirped gratings may also be used in other applications such as chirp cancellation in directly modulated lasers and pulse shaping.

Figure 12:
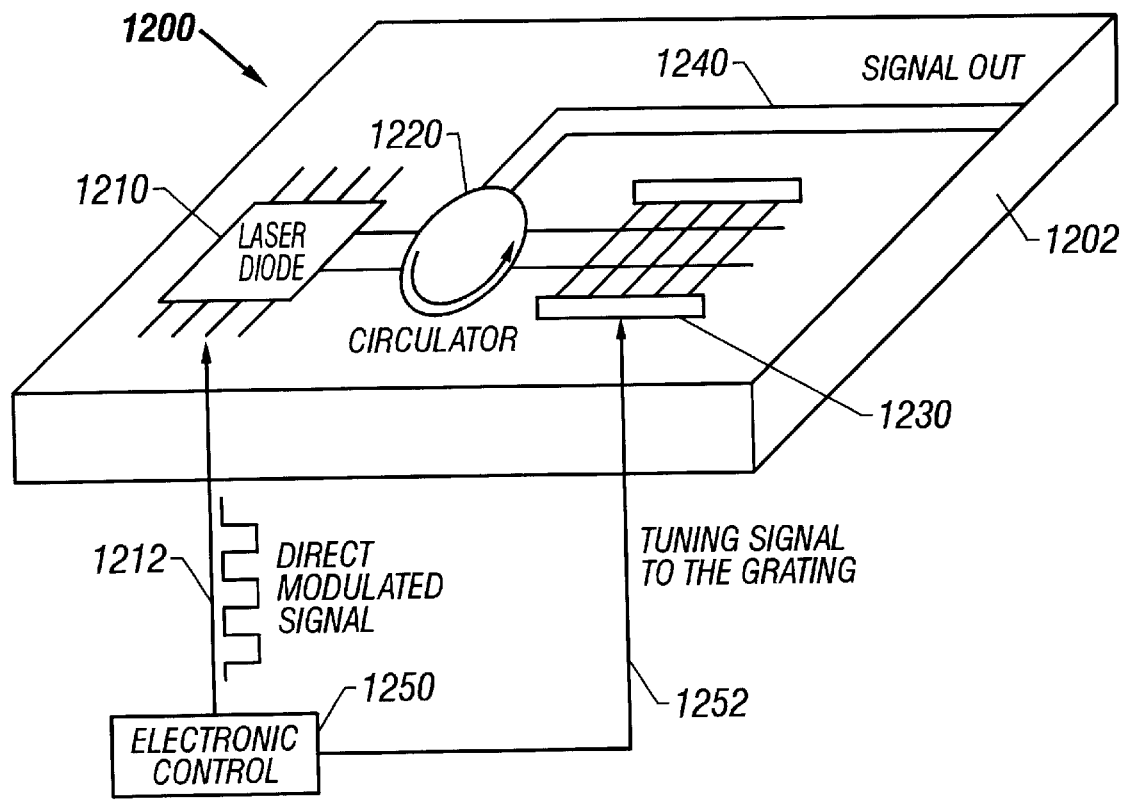
FIG. 12 is a diagram illustrating a semiconductor laser have a nonlinearly chirped waveguide grating for reducing modulation-induced frequency chirps in the laser output.

FIG. 12 shows an integrated semiconductor laser module 1200 having a nonlinearly chirped waveguide grating 1230 for reducing the modulation chirp. A laser diode 1210 is formed on a substrate 1202. A modulation signal 1212 is applied to the laser diode 1210 to modulate the driving current. Such direct modulation can cause frequency chirps in the output of the laser diode 1210. A nonlinearly chirped waveguide grating 1230 is formed on the substrate 1202 to produce a dispersion for reducing the frequency chirp.

The chirp in the laser output changes with the modulation frequency of the modulation signal 1212. The relation between the modulation frequency and the chirp in the laser output can be determined, e.g., by measurements. Based on this relation, a control circuit 1250 can be configured to generate a corresponding dispersion control signal 1252 to adjust the dispersion of the grating 1230. The control circuit 1250 may be located outside the substrate 1202 as shown or alternatively integrated on the substrate 1202. An optical circulator 1220 is located in the optical path between the laser diode 1210 and the grating 1230 to direct the reflected, chirp-reduced laser output from the grating 1230 to an output optical waveguide 1240.

Figure 13:
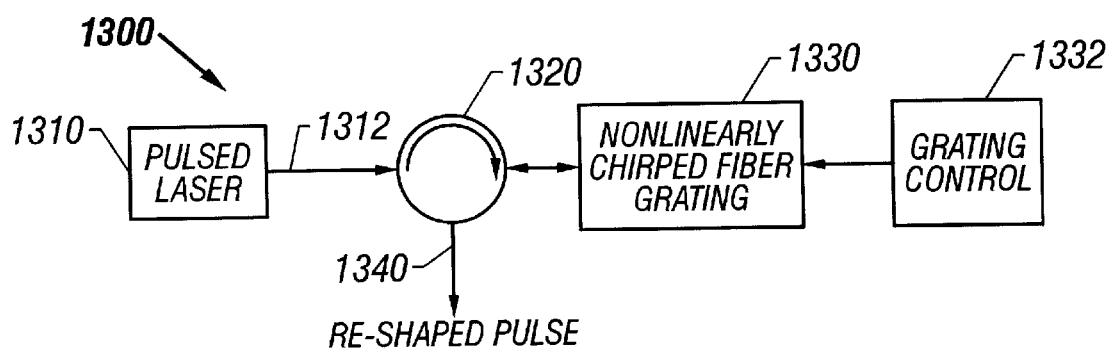
FIG. 13 is a diagram showing a pulse shaping system based on a nonlinearly chirped grating.

FIG. 13 further shows a block diagram of a system 1300 for pulse shaping. A nonlinearly chirped grating 1330 can produce a variable dispersion to an input pulse 1312 from a laser 1310 so that the output 1340 from the grating 1330 coupled to a grating control unit 1332 has a desired pulse shape. An optical circulator 1320 is optically coupled between the laser 1310 and the grating 1330 to route and separate the original laser output pulse 1312 and the reshaped output pulse 1340.

The above described nonlinearly-chirped fiber gratings are configured so that the wavelength of a reflected spectral component, $\lambda(x)=2n_{eff}(x)\Lambda(x)$, is a nonlinear and monotonic function of x. Because the length of the fiber grating is limited, the chirping range of the grating spacings in practical devices is also limited. This results in a reflection spectrum of such fiber gratings with a limited bandwidth as illustrated in FIG. 3A. Such fiber gratings may not be able to compensate for dispersion at two different wavelengths when the difference between the two wavelengths is comparable to or greater than the reflection bandwidth.

A WDM signal in a WDM fiber system has signals at different wavelengths (WDM channels) which propagate in the same fiber. These different wavelengths in the WDM signal can experience different amounts of dispersion when transmitted through a dispersive fiber link from one location to another. Such signals usually have a wavelength difference of about 0.6 nm or greater (e.g., ITU uses 0.8 nm and its multiples at 1.6 nm, 3.2 nm, and so on for WDM systems). The shortest wavelength and the longest wavelength of a WDM signal may be too great for a single fiber grating to provide proper dispersion compensation to both at the same time. For example, the nonlinearly-chirped fiber grating shown in FIG. 6B at a given bias voltage could not reflect two signals of 1551 nm and 1552 nm at the same time. Two such gratings, one with a control voltage of about 0V on the piezo stretcher and one with a control voltage of about 500V on the piezo stretcher, however, can be used together to separately provide dispersion compensation to these two signals. In the embodiments that follow, multiple nonlinearly-chirped fiber gratings may be combined to respectively compensate for dispersions of signals at different wavelengths (WDM channels) in a WDM signal.

Figure 14A:
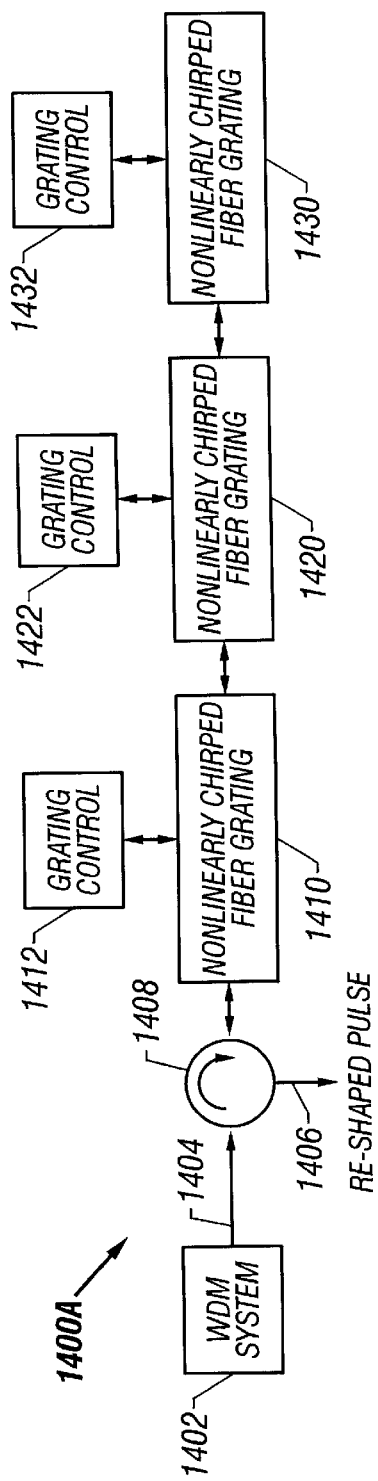
FIGS. 14A and 14B schematically show two implementations of dispersion compensation in a WDM system by using multiple nonlinearly-chirped fiber gratings.
Figure 14B:
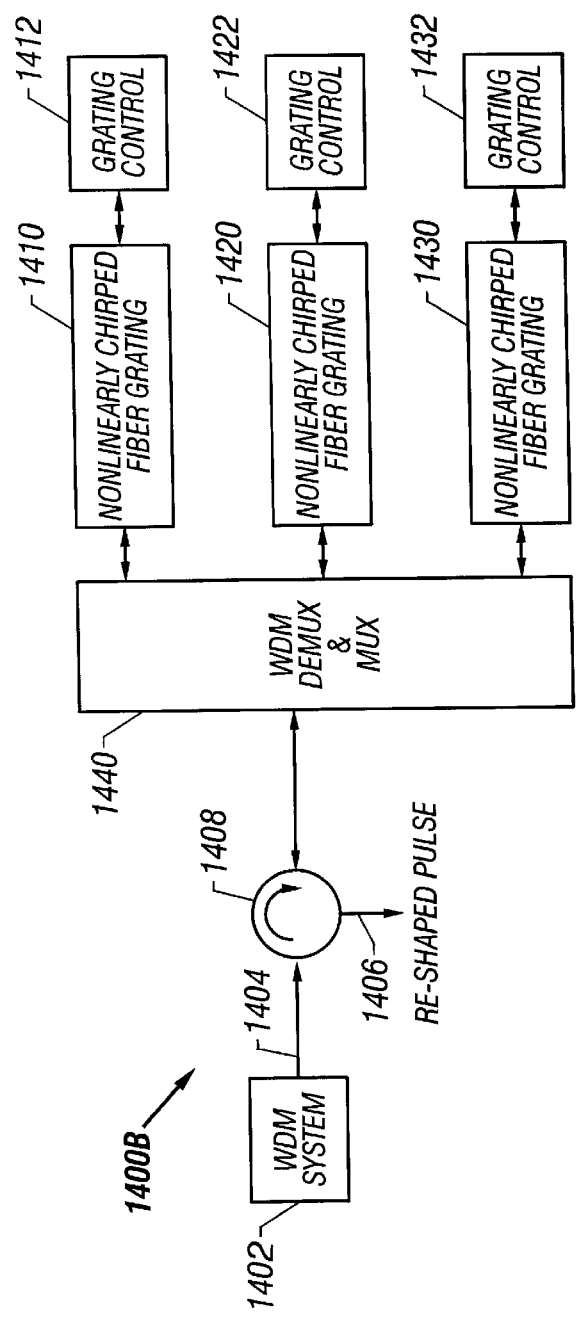

FIGS. 14A and 14B schematically show two implementations 1400A and 1400B of using multiple nonlinearly-chirped fiber gratings 1410, 1420, and 1430 in a WDM system 1402. Each fiber grating 1410, 1420, 1430, respectively has a designated grating controller 1412, 1422, 1432 as a tuning mechanism. A grating controller may be a fiber stretcher (e.g., a piezo element and a voltage supply) or an other tuning device. Similar to the one in FIGS. 10A and 10B, a dispersion detection device may be deployed in each system to indicate dispersion information of an input WDM signal 1404 so that each grating controller can respond accordingly to provide a desired compensation in a respective fiber grating. Alternatively, when the dispersion at different wavelengths in a WDM signal is known at a given node in the WDM system 1402, the dispersion detection device may be eliminated and each fiber grating can be pre-configured to produce the desired compensation at a respective wavelength.

In FIG. 14A, multiple nonlinearly-chirped fiber gratings 1410, 1420, and 1430 are connected in series. Each provides a different compensation at a different wavelength in an input WDM signal 1404. For example, the fiber grating 1410 can be configured to compensate for dispersion within a limited spectral range around a selected wavelength $\lambda_1$. Due to the large separations of the multiplexed signals in wavelength, signals at other wavelengths such as $\lambda_2$ and $\lambda_3$ do not satisfy Bragg conditions in the fiber grating 1410 and hence transmit through the fiber grating 1410. These transmitted signals may then be reflected by other fiber gratings in the series, e.g., 1420 and 1430, to provide proper dispersion compensation. The compensated signals are then reflected back to the input of the first fiber grating 1410 and then routed by an optical circulator 1408 to generate a dispersion-compensated reshaped WDM signal 1406.

FIG. 14B uses multiple fiber gratings 1410, 1420, and 1430 in a parallel configuration. A demultiplexer unit 1440 is used to receive and separate the input WDM signal 1404 into multiple signals of different wavelengths. Each separate signal is then reflected back to the demultiplexer unit 1440 by a corresponding fiber grating in a way that compensates for the dispersion at that wavelength. The demultiplexer unit 1440 then recombines the reflected signals at different wavelengths into a dispersion-compensated WDM signal 1406 that is output by the circulator 1408.

Simultaneous compensation for dispersion at different wavelengths of a WDM system may also be achieved by using a special nonlinearly-chirped fiber grating. Such a fiber grating can replace the multiple fiber gratings and their associated grating controllers in FIGS. 14A and 14B.

Figure 15:
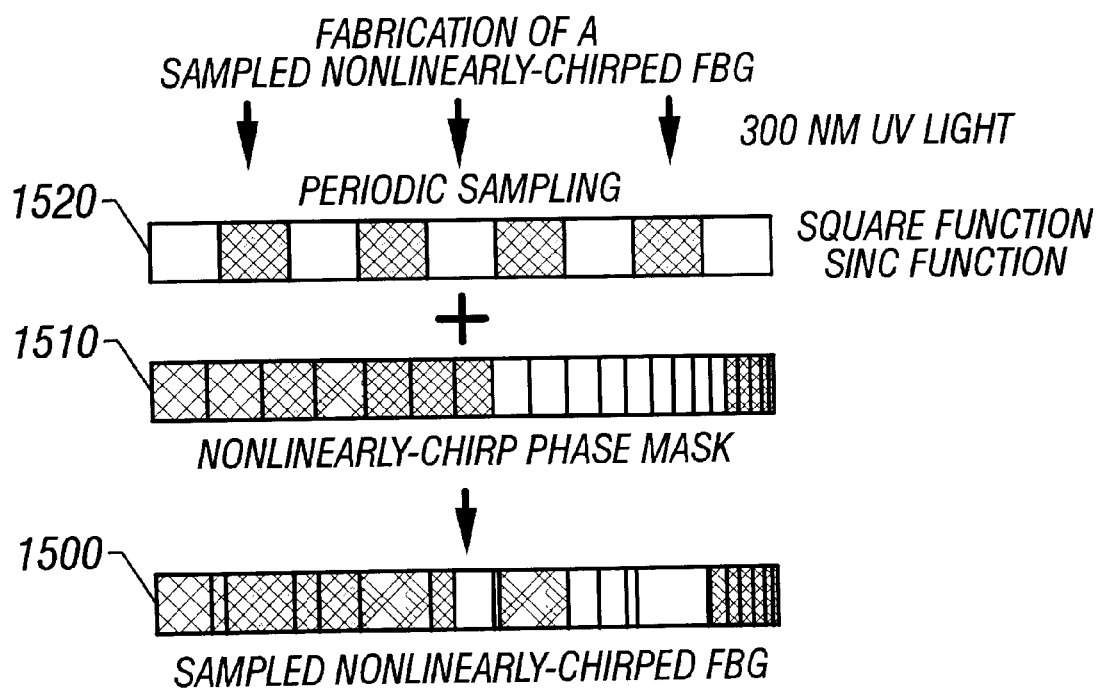
FIG. 15 illustrates the fabrication and structure of a sampled nonlinearly-chirped fiber grating according to one embodiment of the disclosure.

FIG. 15 illustrates the fabrication and structure of such a special fiber grating 1500. The fiber grating 1500 has a nonlinearly-chirped, monotonic-valued grating period $\Lambda(x)$. As described above, this nonlinearly-chirped grating may be formed, according to one implementation, by producing a modulation on the refractive index n(x) of the fiber in a nonlinearly chirped manner along the fiber. When n(x) is modulated in a sinusoidal manner with a constant amplitude, the effective index of refraction $n_{eff}(x)$ is a constant along the fiber. In addition, the refractive index n(x) is also modulated by a second index modulation that has a modulation period greater than the nonlinearly-chirped modulation. Hence, the reflective Bragg wavelength, $\lambda(x)$, is no longer a monotonic-valued and nonlinearly-chirped function of x but rather is a nonlinearly-chirped periodic function of x. Two or more reflection spectral windows centered at different wavelengths can be produced by the two different modulations of the index n(x). Hence, a single fiber grating of this kind can function as two or more fiber gratings each having only one Bragg reflection window.

This special fiber grating 1500 may be formed by the fabrication process illustrated in FIG. 15. A nonlinearly-chirped phase mask 1510 is used to form the nonlinearly chirped index modulation which has a nonlinearly-chirped period $\Lambda_{NC}$ (x). In addition, a periodical amplitude mask 1520 is used to sample the UV light during exposure and thus cause the second index modulation of the index n(x) with a period of $\Lambda_C$. The two masks 1510 and 1520 are fixed to the fiber 1500 during fabrication. An UV light source and the fiber then are moved relative to each other to expose the core of the fiber 1500 one section at a time.

The above process in effect produces two different gratings in the fiber 1500: a nonlinearly-chirped grating $\Lambda_{NC}(x)$ defined by the phase mask 1510 and a periodic grating $\Lambda_C$ defined by the amplitude mask 1520. The coupling of the two gratings forms multiple Bragg reflection windows or bands at different wavelengths. The number of bands and the band spacing are determined by the periodic modulation of the amplitude mask 1520. The bandwidth of each band is identical and is determined by the chirping range of the grating $\Lambda_{NC}(x)$ defined by the phase mask 1510. To distinguish from the nonlinearly-chirped grating shown in FIG. 1, this special fiber grating will be referred to as "sampled nonlinearly-chirped fiber grating".

The second periodic modulation of n(x) has a spatial period $\Lambda_C$ greater than the grating period $\Lambda_{NC}(x)$. For example, $\Lambda_C$ may be in a range from about 0.1 mm to about 2 mm, or more preferably from about 0.2 mm to about 1 mm, while the average $\Lambda_{NC}(x)$ is about 0.5 $\mu$m for fiber systems near 1550 nm. FIGS. 16A through 16F illustrate the multiple reflection spectral windows generated by the second periodic modulation on the refractive index n(x). The reflected Bragg wavelength $\lambda(x)$ is associated with the optical wavevectors that satisfy the Bragg phase-matching conditions by Fourier transforms of n(x), where n(x) is a function of the position x along the optic axis of the fiber, the nonlinearly-chirped period $\Lambda_{NC}(x)$, and the constant period $\Lambda_C$. FIGS. 16A, 16C, and 16E show the spatial variations of the actual refractive index along the fiber, n(x), and FIGS. 16B, 16D, and 16F show respective reflection spectra satisfying the Bragg conditions.

FIG. 16A shows a case where the index n(x) is only modulated by a sinusoidal modulation with a constant period. The Fourier transform of the sinusoidal function n(x) is a single value in the wavevector space, i.e., only one wavevector matches the Bragg condition and gets reflected (FIG. 16B). When the period of the sinusoidal modulation is linearly or nonlinearly chirped, multiple wavevectors of a limited range in the wavevector space can be reflected at different locations along the grating. Hence, the single peak in FIG.16B becomes a reflection spectral window as shown in FIG. 3A.

FIG. 16C represents a case where n(x) is modulated by a fast sinusoidal modulation and a slow spatial square wave function with a constant period. FIG. 16D shows multiple reflection bands that are produced by the slow modulation of the index n(x). These bands have different strengths due to the square-wave modulation. The reflectivity of the band at the center wavelength is the highest and reflectivities of other bands are reduced by a factor determined by a sinc-function. When the slow modulation of n(x) is formed of repetitive patterns of a portion of a spatial sine function, i.e., the amplitude of the slow index modulation is highest at the center of a selected fiber segment and decays towards both ends of the segment according to (sin x/x), the multiple bands of substantially identical reflectivities can be generated.

FIG. 16E shows one repetitive pattern of a slow modulation of n(x). Each repetitive pattern includes first five lobes of a sinc function. FIG. 16F represents 6 bands produced by the slow modulation by n(x) in the frequency domain. The latter is preferred in WDM applications in order to substantially reduce or minimize signal distortion by the fiber grating. Sinc-sampled fiber gratings are disclosed by Ibsen et al. in "Sinc-sampled fiber Bragg gratings for identical multiple wavelength operation," IEEE Photonics Technology Letters, Vol. 10, No. 6, p. 842–844 (1998).

Figure 17:
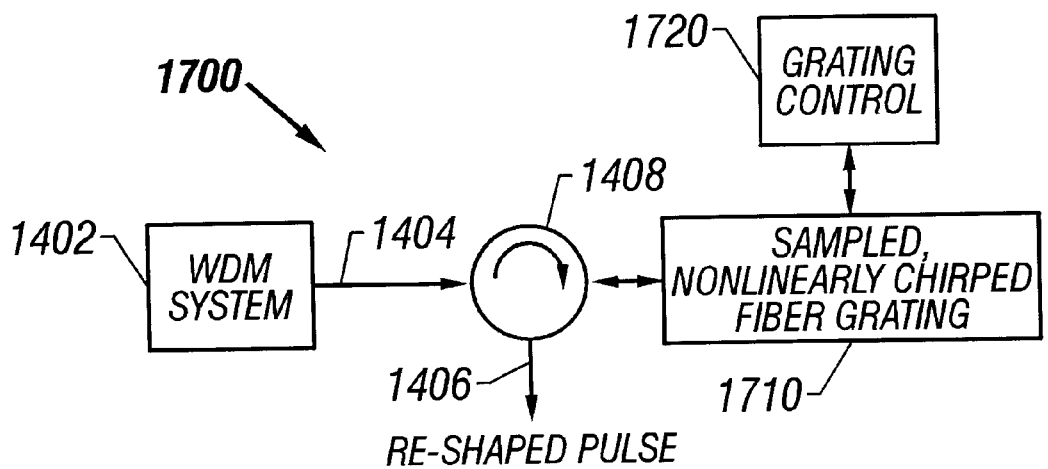
FIG. 17 schematically shows one embodiment of a tunable multi-channel dispersion compensator for a WDM system by using a single sampled nonlinearly-chirped fiber grating.

FIG. 17 shows one embodiment 1700 of a tunable multi-channel dispersion compensator for a WDM system 1402 by using a single sampled nonlinearly-chirped fiber grating 1710. A grating controller 1720 provides a tuning mechanism for the grating 1710 to adjust the dispersions at different wavelengths. A dispersion detection device may be incorporated to measure the actual dispersion in the dispersive WDM signal 1404 and to provide a control signal to the grating controller 1720.

This configuration of using a single fiber grating 1710 provides a number of advantages over a multi-grating configuration shown in FIGS. 14A and 14B. For example, such a single-grating compensator is relatively easy to fabricate and package at a lower cost because only a single fiber grating and a single fiber control are needed. Since the temperature of each grating can affect the grating length and hence the dispersion caused by the grating, the temperature of each grating may need be stabilized and controlled at a desired constant temperature. The single-grating configuration reduces complexity of such temperature stabilization. The single-fiber configuration also has less insertion loss than that of the multi-grating configuration. Furthermore, in the single-grating configuration, the desired channel spacing can be more easily and precisely set by the manufacturing process and the reflectivities of different channels can be made substantially the same. The sampled nonlinearly-chirped fiber Bragg grating 1710 can be fabricated as shown in FIG. 15 by using a sampling slit to effectuate the periodic modulation onto the fiber's refractive index. This sampling slit produces a square-wave modulation similar to FIG. 16C with a period of 200 $\mu$m. A 300-nm light source can be used to avoid damage to the fiber's core-cladding interface. The fiber grating 1710 may be 30 cm in length and sampled by the sample slit to produce 3 principal channels separated by 4 nm. The channel separation is determined by the sampling period:

$$\Delta\lambda = \frac{\lambda_B^2}{2n_{eff} \cdot \Lambda c},$$

where $\Delta\lambda$ is the spacing between the centers of adjacent channels, $\lambda_B$ is the Bragg wavelength of the original grating without sampling, $n_{eff}$ is the effective refractive index in the grating, and $\Lambda_C$ is the sampling period of the slow modulation. By increasing the sampling period L from 200 $\mu$m to about 1 mm, the ITU standard channel spacing of 0.8 nm can be obtained.

FIGS. 17A and 17B show measured shifts of the reflected spectrum and the grating-induced time delay curves, respectively, for the above three-channel sampled nonlinearly-chirped fiber grating under different stretching conditions. All channels exhibit nearly identical optical and time-delay characteristics. The reflectivity difference among the three channels is less than 2 dB and can be reduced by using a sinc-shape modulation of the sampled grating. Within one wavelength reflection band, the dispersion changes smoothly from −200 ps/nm to −1200 ps/nm for different wavelengths. By uniformly stretching the grating, the dispersion varies nonlinearly and smoothly from about −200 ps/nm to about −1200 ps/nm for a fixed wavelength within each band. As the grating is tuned, the amplitudes and shapes of both the reflected spectrum and induced delay curve remain relatively constant for all three channels, allowing for robust operation. The grating ripple is generally less than about 40 ps.

FIG. 17C shows the deviation of the nonlinear time delay from a linear time delay, and the maximum deviation is approximately 600 ps. FIG. 17D shows the grating-induced dispersion of the three different bands as a function of wavelength.

Figure 18:
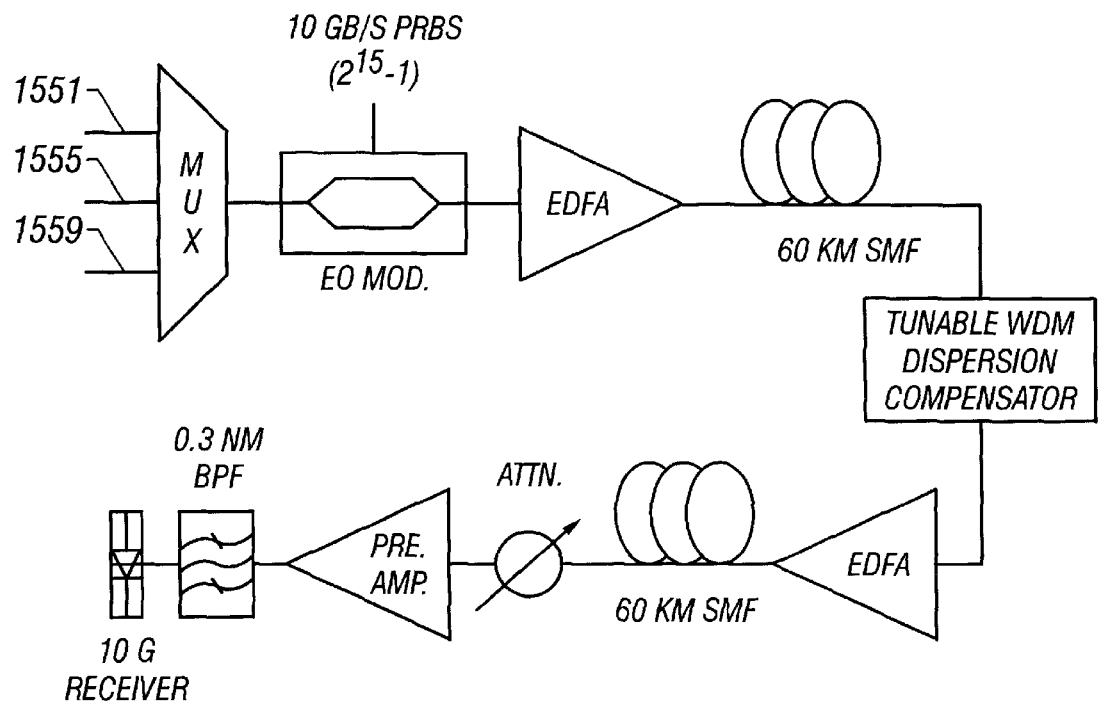
FIG. 18 schematically shows a test apparatus for experimentally simulating tunable dispersion compensation in a WDM system, where three WDM channels at 1551 nm, 1555 nm, and 1559 nm are externally modulated at 10-Gb/s with a pseudorandom bit stream (PRBS) $2^{15}-1$.

FIG. 18 shows a test apparatus for experimentally simulating tunable dispersion compensation in a WDM system. Three WDM channels at 1551 nm, 1555 nm, and 1559 nm are externally modulated at 10-Gb/s with a pseudorandom bit stream (PRBS) $2^{15}-1$. Two different amounts of fiber dispersion are introduced in the signals by transmitting the data over distances of 60 km and 120 km in a single-mode fiber segment, respectively. A small amount of pre-chirping is applied to the signal at an electro-optic modulator in order to increase the maximum usable transmission distance to 120 km with a single-mode fiber segment. The above 3-band sampled nonlinearly-chirped fiber grating is placed at the end of the fiber link for the data approximately after 60 km and is placed at the mid-point of the link for the data approximately after 120 km.

Figure 18A:
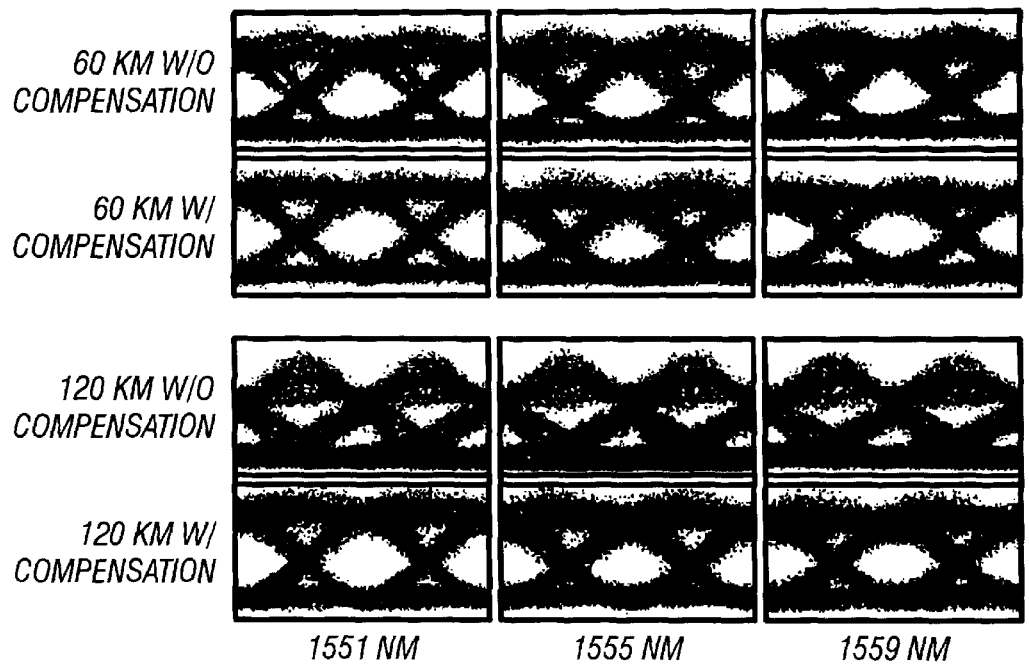
FIG. 18A are eye diagrams at −20 dBm channel input power for the three WDM channels with and without the compensating grating at different distances in the test apparatus of FIG. 18.

FIG. 18A shows the eye diagrams at about −20 dBm channel input power for the three WDM channels with and without the compensating grating at different distances. After transmission over a fiber segment by 60 km, the eye diagrams for the 3 channels are fairly open without compensation, and the grating was tuned to provide a relatively small amount of dispersion compensation. The eye diagrams of the 3 channels after about 120 km of propagation are fairly closed without compensation, and the grating was stretched to shift the resonance bands by about 2 nm to provide sufficient dispersion and open the eye diagrams.

Figure 18B:
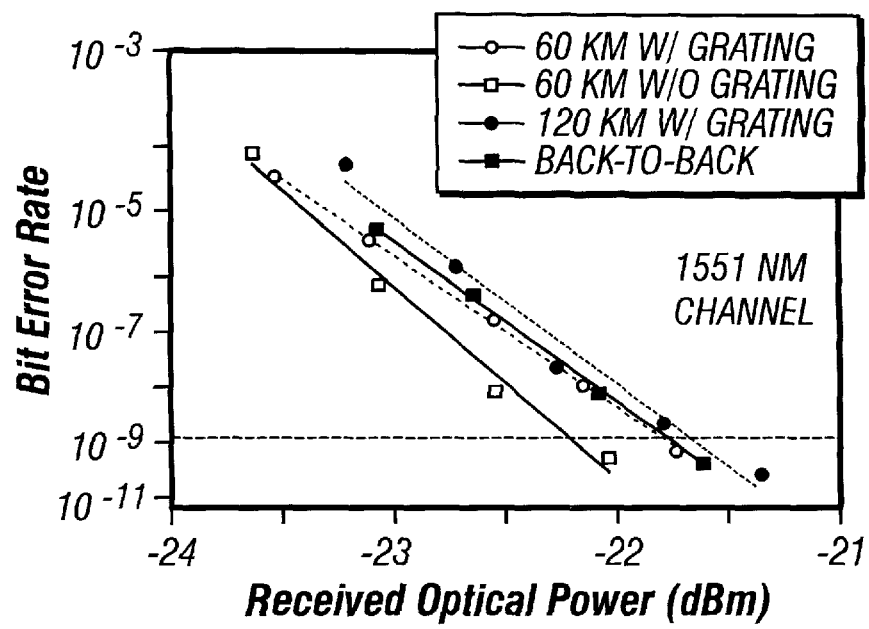
FIG. 18B shows measured bit-error-rate (BER) curves for the 1551-nm channel with and without the sampled compensating grating at the two different distances in the test apparatus of FIG. 18.

FIG. 18B shows the bit-error-rate (BER) curves for the 1551-nm channel with and without the sampled compensating grating at the two different distances. Due to the initial chirp of the WDM signal, the sensitivity at 60 km without compensation is slightly better than the back-to-back measurement. Comparing the BER curves with and without the grating after 60 km, the power penalty induced by the grating is ~0.5 dB. After 120 km, the power penalty of the sampled grating compensator is less than 0.5 dB after 120 km, compared with back-to-back BER curve. Without compensation by the fiber grating, the bit error rate was much larger than $10^{-9}$ after transmission over 120 km. The BER curves for the other two channels show similar results at both transmission distances.

A sampled nonlinearly-chirped fiber grating may be configured in a way so that the frequency spacing between two adjacent bands in the reflected spectrum of the grating is different from the channel spacing in a WDM signal. Since spectral components of different wavelengths in a band experience different dispersion compensations (FIGS. 17B and 17D), the dispersions of two different signals in two different bands at different relative locations with respect to the centers of bands are different. This feature of a sampled nonlinearly-chirped fiber grating can be used to provide different dispersion compensations to different channels in a WDM signal. For example, dispersion of optical fiber can vary significantly over the gain bandwidth of an Er-doped fiber amplifier (EDFA). In conventional fibers, the dispersion slope, (dD/dλ), of the dispersion (D) with respect to the wavelength (λ) is about 0.08 ps/nm²/km. This wavelength dependence of chromatic dispersion presents special problems in long-haul WDM systems because signals of different wavelengths may undergo different dispersions. Therefore, it is desirable to provide different dispersion compensations to signals with different wavelengths.

Figure 19A:
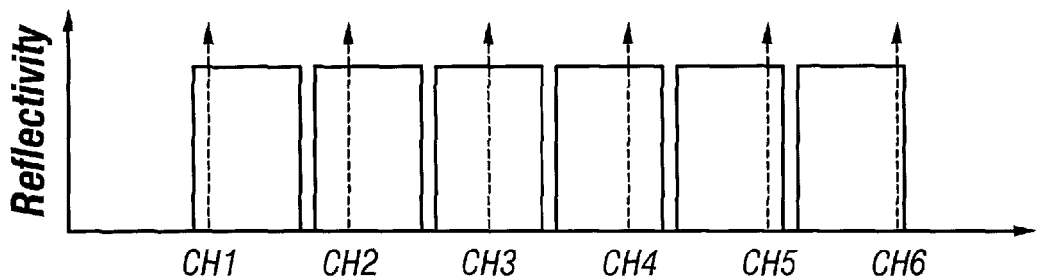
FIGS. 19A and 19B respectively show reflectivity and dispersion spectra of a tunable sampled nonlinearly-chirped fiber grating having a spacing between adjacent Bragg reflection windows that is different from the channel spacing in a WDM system.
Figure 19B:
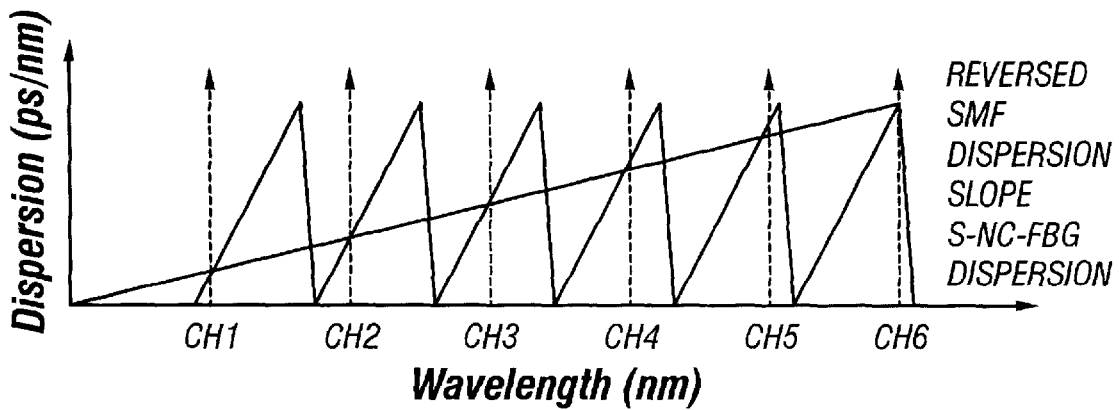

FIGS. 19A and 19B illustrate the operation of a single sampled nonlinearly-chirped fiber grating for producing a tunable dispersion slope compensation. FIG. 19A shows that the band spacing of the fiber grating is less than the channel spacing so that each channel of the WDM signal is then located at a different position in each reflected band of the fiber grating relative to the center of each band. FIG. 19B shows a different dispersion compensation is so generated for a different channel in an example where the dispersion compensation increases with wavelength.

In addition to dispersion compensation, the above sampled nonlinearly chirped fiber grating may be used for chirp cancellation in directly modulated multi-wavelength semiconductor laser and simultaneous tunable compression of multi-channel ultra short pulses. Device implementations for such applications are similar to FIGS. 12 and 13 except that the laser source 1210 or 1310 is replaced by a source that produces a laser signal of multiple wavelengths.

A nonlinearly-chirped fiber may also be modified to compensate for polarization mode dispersion (PMD) in fibers. Many fibers are known to exhibit some birefringence caused by factors such as imperfect circular core or unbalanced stress of the fiber. Optical fiber can accommodate two different states of polarization of light in a fiber. Since the effective indices of refraction of the two polarization states are not the same, the transmission speeds of the two polarization states are different. This polarization mode dispersion is undesirable and can distort the signal.

PMD can be compensated by delaying one polarization state with respect to the other by a proper amount to cancel the delay between the two polarization states in the fiber link. Since the amount of PMD at any given location in a fiber network often changes due to environmental disturbances such as vibrations and fluctuations in temperature, it is highly desirable to have a tunable PMD compensator that can dynamically adjust the relative delay between two states of polarization in a signal. Such polarization-dependent dispersion compensation can be achieved by introducing birefringence in the above nonlinearly-chirped fiber gratings.

One embodiment of a nonlinearly-chirped fiber grating for PMD compensation is formed by writing nonlinearly-chirped grating into a high-birefringence photosensitive fiber. The difference in the indices of refraction for the two principal polarization axes may be on the order of $10^{-4}$ or greater (e.g., $5 \times 10^{-4}$) at or near 1550 nm. The high-birefringence fiber provides different time delays for different states of polarization. The nonlinear chirp allows tuning of relative delays of different spectral components in each state of polarization and a frequency shift in the reflective spectral band.

Figure 20A:
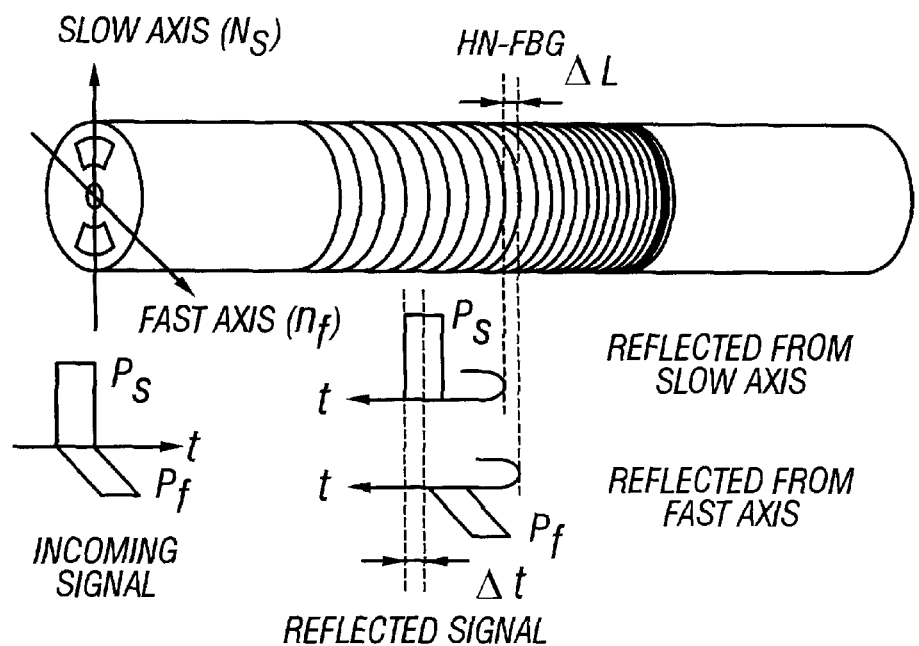
FIG. 20A is a diagram showing a birefringent nonlinearly-chirped fiber Bragg grating formed in a high-birefringence optical fiber for compensating polarization mode dispersion (PMD).
Figure 20B:
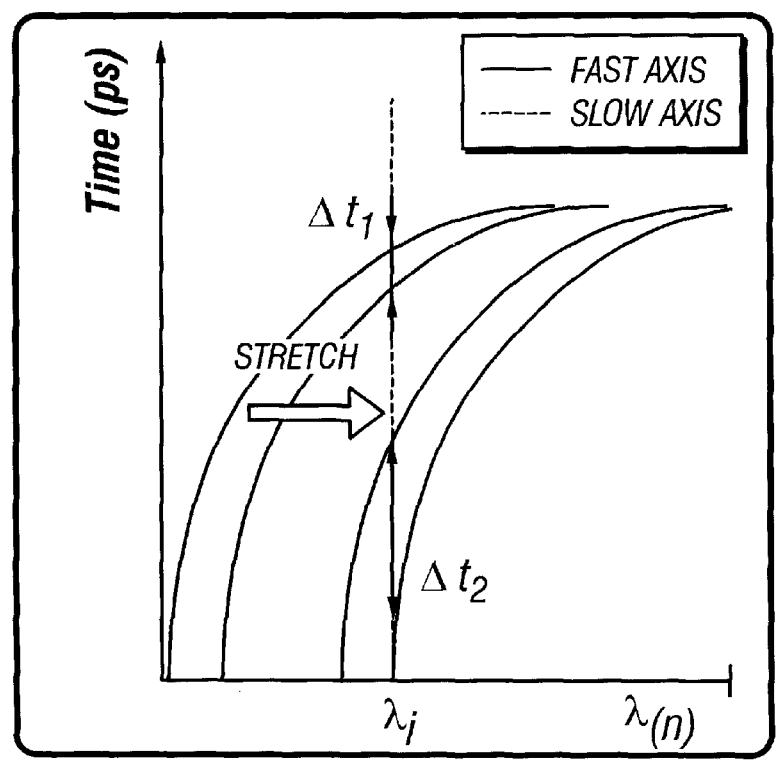
FIG. 20B shows time delays of two orthogonal states of polarization as a function of wavelength from the birefringent nonlinearly-chirped fiber Bragg grating of FIG. 20A.

FIG. 20A illustrates a birefringent nonlinearly-chirped fiber Bragg grating formed in a high-birefringence optical fiber. The high-birefringence optical fiber may be formed of a polarization-maintaining fiber. This allows a large difference in refractive indices between fast and slow polarization axes. The reflection position from the nonlinearly-chirped grating is different for each polarization of an input optical signal at one fixed wavelength within the grating bandwidth. This difference in reflection positions, ΔL, causes a differential time delay (Δt) between the two polarization states (FIG. 20B). The differential time delay is dependent of the wavelengths of different spectral components within the grating bandwidth due to the nonlinear chirping of the grating period. This combination of the birefringence of the fiber and the nonlinear chirping of the grating provides a tuning mechanism for adjusting the relative delays between two polarization states by mechanical stretching of the grating. Optical signals having two different polarization states can be combined at the output of the grating without interference because of their orthogonal polarization states. In an actual implementation, a fiber stretcher may be used to control the length of the birefringent nonlinearly-chirped fiber grating. A dispersion detection module is used to monitor the PMD and to control the fiber grating accordingly in order to produce the proper dispersion compensation.

An exemplary nonlinearly-chirped grating may be written on a photosensitive highly birefringent fiber through a nonlinearly-chirped phase mask using near-UV light at about 300 nm. The grating may be 15 cm long and nonlinearly chirped from 1547.2 nm to 1550.5 nm for two polarization directions. At a given location in the fiber grating, the reflected signals of the orthogonal polarization directions have two different wavelengths that are separated by $\Delta\lambda$:

$$\Delta\lambda = \frac{n_s - n_f}{n - n_{cl}} \lambda_g,$$

where $n_s$, $n_f$, $n$, $n_{cl}$, and $\lambda_g$ respectively represent slow axis, fast axis, core, cladding refractive indices and average of the fast and slow polarization resonant wavelengths.

Figure 21A:
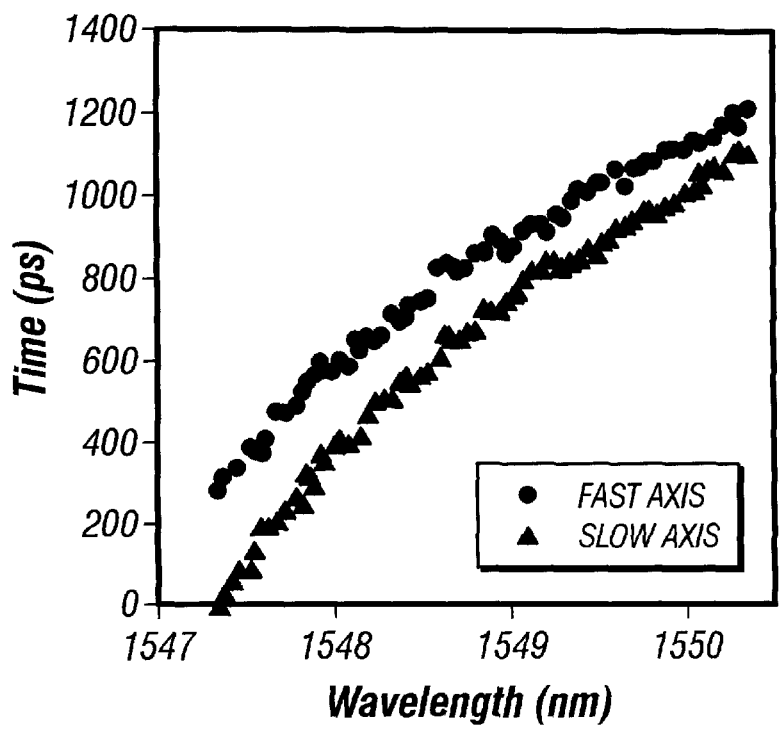
FIGS. 21A and 21B show measured time delay curves of the reflected signals as a function of wavelength and the respective nonlinear dependence of the differential time delay on the wavelength for each polarization direction from a birefringent nonlinearly-chirped fiber grating with $\Delta\lambda$, of around 0.6 nm at 1550 nm.
Figure 21B:
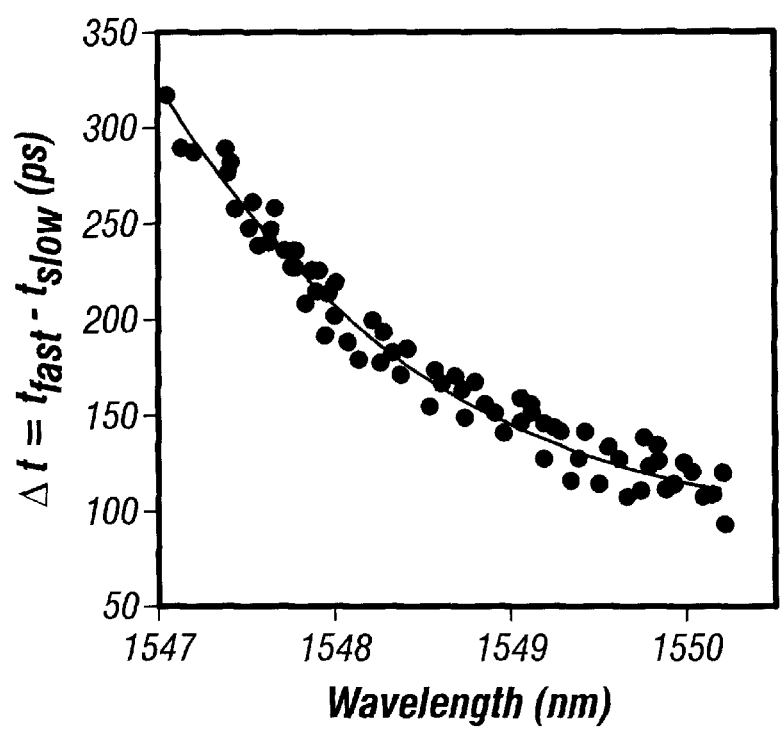

FIG. 21A shows measured time delay curves of the reflected signals as a function of wavelength for each polarization direction from a birefringent nonlinearly-chirped fiber grating with $\Delta\lambda$ of around 0.6 nm at 1550 nm. Note that almost identically-chirped gratings are written for both polarization directions. FIG. 21B shows the respective nonlinear dependence of the differential time delay on the wavelength. The time delay $\Delta t$ changes from 320 ps to 100 ps when wavelength changes from 1547.03 nm to 1550.34 nm. The solid line provides the expected time delay between the two polarization states, obtained by fitting the experimental data.

Figure 22A:
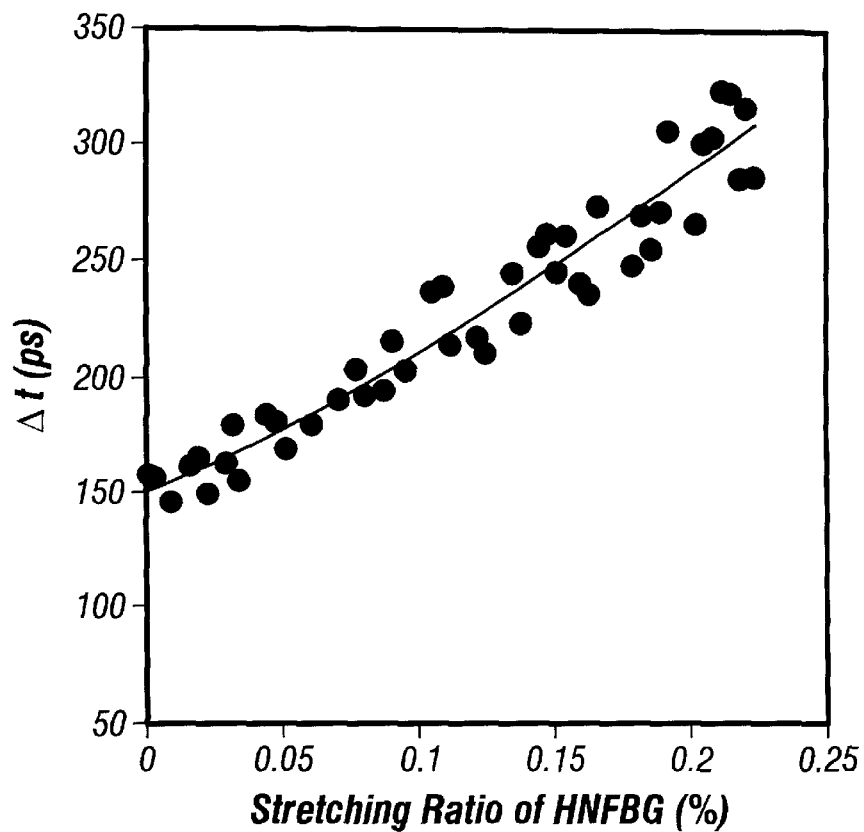
FIG. 22A shows the measured time delay as a function of the relative amount of stretching of the fiber grating characterized in FIGS. 21A and 21B.
Figure 22B:
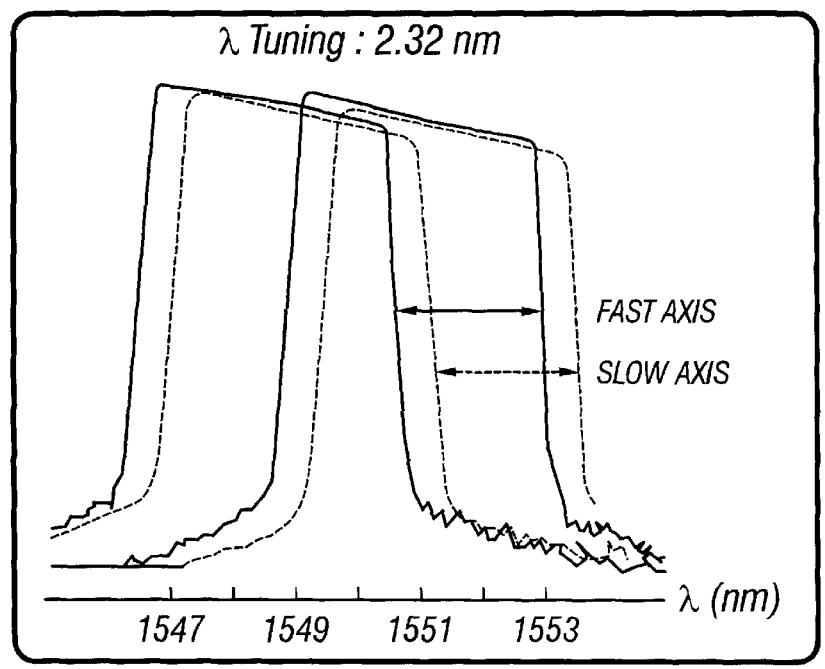
FIG. 22B shows that the shape of reflection spectrum for each polarization direction in remains substantially the same over a wavelength tuning of about 2.32 nm by stretching in the birefringent nonlinearly-chirped fiber grating with $\Delta\lambda$ of around 0.6 nm at 1550 nm.

FIG. 22A shows measured time delay as a function of the relative amount of stretching of the same fiber grating. The measurements were performed by mounting the birefringence fiber grating on a translational stage. The time delay $\Delta t$ of the two polarizations for a signal at 1549.33 nm changes due to stretching of the fiber grating. A tuning $\Delta t$ of approximately 170 ps is achieved by 0.22% stretching of the grating at 1549.33 nm. FIG. 22B shows that the shape of reflection spectrum for each polarization direction does not change significantly over a wavelength tuning of about 2.32 nm by stretching.

Stretching of the fiber grating provides tunable compensation of PMD on long distance, high-speed optical data transmission. This is because $\Delta t$ is tunable and the polarization does not change. To demonstrate this application, a DBR laser at 1550.2 nm is externally modulated at 10 Gb/s PRBS in a non-return-to-zero data format using a 16 GHz electro-optic intensity modulator. Delays of about 127 ps and 302 ps are respectively introduced between the two orthogonal polarizations of the signal to simulate the effect of PMD by using a PMD emulator. The PMD emulator includes two polarization beam splitters, optical delay and mechanical attenuator. The power ratio into one of the paths is adjusted to be the same for each path to simulate the worst condition of PMD. A polarization controller is used before the birefringent nonlinearly-chirped fiber grating to align the polarization directions to the grating.

FIG. 23A shows the base-line eye diagram of the signal at the output of the intensity modulator. FIG. 23B shows the eye diagrams for the 127-ps PMD emulation with and without dispersion compensation being performed by the grating. The emulated eye is completely closed because emulation is larger than one bit period. The three-level eye comes from the fact that optical delay from the PMD emulator is almost multiple times of the bit time.

FIG. 23C shows the eye diagrams for the 302-ps PMD emulation without and with compensation of HN-FBG with tuning by 0.215% stretching. The eye is completely recovered after compensation, and bit-error-rate measurements confirm error free operation for both compensated cases.

Although the present invention has been described in detail with reference to a few embodiments, various modifications and enhancements may be made. For example, a sampled nonlinearly-chirped fiber grating may be formed in a highly birefringent fiber to combine the multiple bands of the fiber grating in FIG. 15 and the PMD compensation of the fiber grating in FIG. 20A. This hybrid fiber grating can compensate the PMD in a WDM signal and wavelength-dependent PMD. Also, while fiber stretchers are described in the disclosure, it should be understood that a fiber compressor or a device that changes any other characteristics of the fiber, could alternatively be used. These and other embodiments are intended to be encompassed by the following claims.

What is claimed is:

1. A device, comprising:
   a wave-guiding element having (1) an optic axis to transport optical energy along said optic axis and (2) a spatial grating pattern which is an oscillatory variation along said optic axis, said wave-guiding element configured to receive an input optical signal and to produce an output optical signal by reflection within a Bragg reflection band produced by said spatial grating pattern so as to produce time delays of different reflected spectral components as a nonlinear function of spatial positions along said optic axis at which said different reflected spectral components are respectively reflected; and
   a control unit engaged to said wave-guiding element and operable to change a property of said spatial grating pattern along said optic axis to tune at least relative time delays of said different reflected spectral components nonlinearly with respect to wavelength.

2. The device as in claim 1, wherein said control unit is configured to control a length of said wave-guiding element along said optic axis.

3. The device as in claim 2, wherein said control unit includes a piezoelectric element.

4. The device as in claim 2 wherein said control unit includes a magnetostrictive element that operates in response to a control magnetic field.

5. The device as in claim 1, wherein said control unit is configured to generate a varying control electrical field along said optic axis and said wave-guiding element is configured to have an index of refraction that changes in response to said varying control electrical field so as to tune said relative time delays.

6. The device as in as in claim 1, wherein said control unit is configured to generate a varying control electromagnetic radiation field along said optic axis and said wave-guiding element is configured to have an index of refraction that changes in response to said electromagnetic radiation field so as to tune said relative time delays.

7. The device as in claim 1, wherein said control unit includes an acoustic wave generator configured and coupled to produce a frequency-tunable acoustic wave along said optic axis of said wave-guiding element so that said acoustic wave alters a frequency response of said wave-guiding element.

8. The device as in claim 1, wherein said control unit is configured to control both a length and a refractive index of said wave-guiding element along said optic axis.

9. The device as in claim 1, wherein said control unit is configured to control a refractive index of said wave-guiding element along said optic axis.

10. The device as in claim 1, further comprising:
a dispersion monitor unit configured and coupled to monitor information of optical dispersion in said output signal and coupled to inform said control unit of said information,
wherein said control unit is operable to adjust said property of said spatial grating pattern in response to said information.

11. The device as in claim 1, wherein said wave-guiding element includes an optical fiber having a fiber core and a fiber cladding surrounding said fiber core.

12. The device as in claim 1, wherein said control unit is configured to control a temperature of said wave-guiding element.

13. The device as in claim 1, wherein said wave-guiding element includes an optical waveguide formed on a substrate.

14. The device as in claim 1, wherein said spatial grating pattern has a grating period that is nonlinearly chirped along said optic axis.

15. The device as in claim 1, wherein said spatial grating pattern includes a spatial nonlinear chirp in one aspect of an index of refraction of said wave-guiding element along said optic axis.

16. A system, comprising:
a plurality of optical devices connected in series so that an optical transmission output from one optical device is received by another adjacent optical device located in a downstream of said optical output, wherein each optical device is configured to be independently controlled and includes:
a wave-guiding element having (1) an optic axis to transport optical energy along said optic axis and (2) a spatial grating pattern which is an oscillatory variation along said optic axis, said wave-guiding element configured to receive an input optical signal and to produce (1) an output optical signal by reflection within a Bragg reflection band produced by said spatial grating pattern so as to produce time delays of different reflected spectral components as a nonlinear function of spatial positions along said optic axis at which said different reflected spectral components are respectively reflected, and (2) an output transmission optical signal having spectral components that are not reflected, and
a control unit engaged to said wave-guiding element and operable to change a property of said spatial grating pattern along said optic axis to tune at least relative time delays of said different reflected spectral components nonlinearly with respect to wavelength,
wherein different spatial grating patterns in different optical devices are configured to produce Bragg reflection bands at different wavelengths.

17. The system as in claim 16, wherein said control unit in each optical device is configured to control a length of said wave-guiding element along said optic axis.

18. The system as in claim 16, wherein said control unit in each optical device is configured to control a refractive index of said wave-guiding element along said optic axis.

19. The system as in claim 16, wherein said control unit in each optical device is configured to control both a length and a refractive index of said wave-guiding element along said optic axis.

20. The system as in claim 16, further comprising:
a dispersion monitor unit configured and coupled to monitor information of optical dispersion in a final optical output signal from said plurality of optical devices and coupled to communicate said information to at least one of said plurality of optical devices,
wherein said control unit in said at least one optical device is operable to adjust said property of said spatial grating pattern of said wave-guiding element in response to said information to alter optical dispersion in said final optical output signal.

21. The system as in claim 16, wherein said wave-guiding element in each optical device includes an optical fiber having a fiber core and a fiber cladding surrounding said fiber core, and further comprising interconnecting optical fibers to interconnect said plurality of optical devices.

22. The system as in claim 16, wherein said control unit in at least one optical device is configured to control a temperature of said wave-guiding element to achieve said nonlinear tuning.

23. The system as in claim 16, wherein said wave-guiding element in at least one optical device includes an optical waveguide formed on a substrate.

24. The system as in claim 16, wherein said spatial grating pattern has a grating period that is nonlinearly chirped along said optic axis.

25. The system as in claim 16, wherein said spatial grating pattern includes a spatial nonlinear chirp in one aspect of an index of refraction of said wave-guiding element along said optic axis.

26. A system, comprising:
an input optical fiber carry a plurality of optical WDM channels;
a WDM unit coupled to said input optical fiber and configured to spatially separate said WDM channels;
a tunable dispersion module, connected to said WDM unit to receive said WDM channels and operable to change dispersions of said WDM channels to produce modified WDM channels, said dispersion module comprising a plurality of optical devices which are coupled in parallel with respect to one another to said WDM unit to receive said WDM channels and to produce said modified WDM channels, wherein each optical device includes:
a wave-guiding element having (1) an optic axis to transport optical energy along said optic axis and (2) a spatial grating pattern which is an oscillatory variation along said optic axis, said wave-guiding element configured to receive an input optical signal and to produce an output optical signal by reflection within a Bragg reflection band produced by said spatial grating pattern so as to produce time delays of different reflected spectral components as a nonlinear function of spatial positions along said optic axis at which said different reflected spectral components are respectively reflected, and
a control unit engaged to said wave-guiding element and operable to change a property of said spatial grating pattern along said optic axis to tune at least relative time delays of said different reflected spectral components nonlinearly with respect to wavelength,
wherein different spatial grating patterns in different optical devices are configured to produce Bragg reflection bands at different wavelengths.

27. The system as in claim 26, wherein said control unit in each optical device is configured to control a length of said wave-guiding element along said optic axis.

28. The system as in claim 26, wherein said control unit in each optical device is configured to control a refractive index of said wave-guiding element along said optic axis.

29. The system as in claim 26, wherein said control unit in each optical device is configured to control both a length and a refractive index of said wave-guiding element along said optic axis.

30. The system as in claim 26, further comprising:
a dispersion monitor unit configured and coupled to monitor information of optical dispersion in said modified WDM channels and coupled to communicate said information to at least one of said plurality of optical devices,
wherein said control unit in said at least one optical device is operable to adjust said property of said spatial grating pattern of said wave-guiding element in response to said information to alter optical dispersion in said modified WDM channels.

31. The system as in claim 26, wherein said wave-guiding element in each optical device includes an optical fiber having a fiber core and a fiber cladding surrounding said fiber core, and further comprising interconnecting optical fibers to interconnect said plurality of optical devices to said WDM unit.

32. The system as in claim 26, wherein said control unit in at least one optical device is configured to control a temperature of said wave-guiding element to achieve said nonlinear tuning.

33. The system as in claim 26, wherein said wave-guiding element in at least one optical device includes an optical waveguide formed on a substrate.

34. The system as in claim 26, wherein said spatial grating pattern has a grating period that is nonlinearly chirped along said optic axis.

35. The system as in claim 26, wherein said spatial grating pattern includes a spatial nonlinear chirp in one aspect of an index of refraction of said wave-guiding element along said optic axis.

36. A system, comprising:
a laser configured to produce a laser beam;
a wave-guiding element having (1) an optic axis to transport optical energy along said optic axis and (2) a spatial grating pattern which is an oscillatory variation along said optic axis, said wave-guiding element positioned to receive said laser beam from said laser and to produce an output laser beam by reflection within a Bragg reflection band produced by said spatial grating pattern so as to produce time delays of different reflected spectral components as a nonlinear function of spatial positions along said optic axis at which said different reflected spectral components are respectively reflected; and
a control unit engaged to said wave-guiding element and operable to change a property of said spatial grating pattern along said optic axis to tune at least relative time delays of said different reflected spectral components nonlinearly with respect to wavelength.

37. The system as in claim 36, wherein said laser is a pulsed laser.

38. The system as in claim 36, further comprising a substrate, wherein said laser and said wave-guiding element are integrated on said substrate.

39. The system as in claim 36, wherein said wave-guiding element is an optical waveguide formed on said substrate.

40. The system as in claim 36, wherein said spatial grating pattern has a grating period that is nonlinearly chirped along said optic axis.

41. The system as in claim 36, wherein said spatial grating pattern includes a spatial nonlinear chirp in one aspect of an index of refraction of said wave-guiding element along said optic axis.

42. A method, comprising:
designing a wave-guiding element to have (1) an optic axis to transport optical energy along said optic axis and (2) a spatial grating pattern which is an oscillatory variation along said optic axis so that said wave-guiding element operates to produce an output optical signal by reflection within a Bragg reflection band produced by said spatial grating pattern with time delays of different reflected spectral components as a nonlinear function of spatial positions along said optic axis at which said different reflected spectral components are respectively reflected;
directing an input optical signal into said wave-guiding element to produce said output optical signal; and
controlling said wave-guiding element to change a property of said spatial grating pattern along said optic axis so as to tune at least relative time delays of said different reflected spectral components nonlinearly with respect to wavelength.

43. The method as in claim 42, further comprising setting an amount of change in said property of said spatial grating pattern to control dispersion in said output optical signal.

44. The method as in claim 42, further comprising setting an amount of change in said property of said spatial grating pattern so that grating-induced dispersion in said output optical signal negates original dispersion present in said input optical signal.

45. The method as in claim 42, wherein said property includes a length of said wave-guiding element along said optic axis.

46. The method as in claim 45, further comprising engaging a piezoelectric element to said wave-guiding element to control said length.

47. The method as in claim 45, further comprising employing a magnetostrictive element to control said length in response to a control magnetic field.

48. The method as in claim 42, wherein said wave-guiding element is configured to have an index of refraction that changes in response to a varying control electrical field along said optic axis, and further comprising:
generating said varying control electrical field;
applying said varying control electrical field to said wave-guiding element; and
controlling said varying control electrical field to tune said relative time delays nonlinearly with respect to wavelength.

49. The method as in as in claim 42, wherein said wave-guiding element is configured to have an index of refraction that changes in response to a varying control electromagnetic radiation field along said optic axis, and further comprising:
generating said varying control electromagnetic radiation field;
applying said varying control electromagnetic radiation field to said wave-guiding element; and
controlling said varying control electromagnetic radiation field to tune said relative time delays nonlinearly with respect to wavelength.

50. The method as in claim 42, wherein said property includes a frequency response of said wave-guiding element, and further comprising:
generating and applying a frequency-tunable acoustic wave along said optic axis of said wave-guiding element; and controlling said acoustic wave to alter said frequency response of said wave-guiding element to achieve said nonlinear tuning.

51. The method as in claim 42, wherein both a length and a refractive index of said wave-guiding element along said optic axis are controlled to achieve said nonlinear tuning.

52. The method as in claim 42, wherein a refractive index of said wave-guiding element along said optic axis is controlled to achieve said nonlinear tuning.

53. The method as in claim 42, further comprising:
obtaining information of optical dispersion in said output signal; and
adjusting said property of said spatial grating pattern in response to said information.

54. The method as in claim 53, further comprising using said information to dynamically adjust grating-induced dispersion produced by said wave-guiding element in response to a time-dependent change in dispersion in said input optical signal.

55. The method as in claim 42, wherein said wave-guiding element includes an optical fiber having a fiber core and a fiber cladding surrounding said fiber core.

56. The method as in claim 42, wherein said controlling includes controlling a temperature of said wave-guiding element to achieve said nonlinear tuning.

57. The method as in claim 42, wherein said wave-guiding element includes an optical waveguide formed on a substrate.

58. The method as in claim 42, wherein said spatial grating pattern has a grating period that is nonlinearly chirped along said optic axis.

59. The method as in claim 42, wherein said spatial grating pattern includes a spatial nonlinear chirp in one aspect of an index of refraction of said wave-guiding element along said optic axis.

60. The method as in claim 42, wherein said input optical signal is a pulsed laser beam from a pulsed laser, and further comprising controlling said wave-guiding element to control a pulse shape of said pulsed laser beam.

61. A method, comprising:
designing a fiber Bragg grating in a fiber to have a spatial grating pattern which is an oscillatory variation along said fiber to produce an output optical signal by reflection within a Bragg reflection band produced by said spatial grating pattern so that time delays of different reflected spectral components are a nonlinear function of spatial positions along said fiber at which said different reflected spectral components are respectively reflected;
directing an input optical signal into said fiber Bragg grating to produce said output optical signal;
controlling a property of said spatial grating pattern of said fiber Bragg grating so as to (1) shift said Bragg reflection in frequency and (2) tune at least relative time delays of said different reflected spectral components nonlinearly with respect to wavelength.

62. The method as in claim 61, wherein both a length and a refractive index of said fiber Bragg grating along said fiber are controlled.

63. The method as in claim 61, wherein a refractive index of said fiber Bragg grating along said fiber is controlled.

64. The method as in claim 61, wherein a length of said fiber Bragg grating along said fiber is controlled.

65. The method as in claim 61, further comprising setting an amount of change in said property of said spatial grating pattern to control dispersion in said output optical signal.

66. The method as in claim 61, further comprising setting an amount of change in said property of said spatial grating pattern so that grating-induced dispersion in said output optical signal negates original dispersion present in said input optical signal.

67. The method as in claim 61, further comprising:
obtaining information of optical dispersion in said output signal; and
adjusting said property of said spatial grating pattern in response to said information.

68. The method as in claim 61, further comprising using said information to dynamically adjust grating-induced dispersion produced by said fiber Bragg grating in response to a time-dependent change in dispersion in said input optical signal.

69. The method as in claim 61, wherein said spatial grating pattern has a grating period that is nonlinearly chirped along said optic axis.

70. The method as in claim 61, wherein said spatial grating pattern includes a spatial nonlinear chirp in one aspect of an index of refraction of said fiber Bragg along said fiber.

71. The method as in claim 61, further comprising:
deploying a plurality of additional fiber Bragg gratings connected in series to said fiber Bragg grating to receive a transmitted optical signal from said fiber Bragg grating so that an optical transmission signal from one additional fiber Bragg grating is received by another adjacent additional fiber Bragg located in a downstream of said optical transmission signal, wherein transmission of each fiber Bragging includes spectral components outside a respective Bragg reflection band which are not reflected, and wherein each additional fiber Bragg grating is designed to produce time delays of different reflected spectral components as a nonlinear function of spatial positions along each fiber and to have a unique Bragg reflection band at a center band wavelength different any other fiber Bragg grating; and
controlling each additional fiber Bragg grating to tune at least relative time delays of said different reflected spectral components nonlinearly with respect to wavelength in each respective Bragg reflection band to control dispersion in respectively reflected optical signals.

72. The method as in claim 61, further comprising:
separating WDM channels received from an input optical fiber;
providing additional fiber Bragg gratings connected in parallel to said fiber Bragg grating to receive WDM channels from said input optical fiber, respectively, wherein each additional fiber Bragg grating is designed to produce time delays of different reflected spectral components as a nonlinear function of spatial positions along each fiber and to have a unique Bragg reflection band at a center band wavelength different any other fiber Bragg grating;

selecting a first WDM channel as said input optical signal directed into said fiber Bragg grating, wherein said first WDM channel is selected within said Bragg reflection band said fiber Bragg grating;

selecting and directing other WDM channels to said additional fiber Bragg gratings so that each WDM channel is within a Bragg reflection band of a respective Bragg reflection band;

controlling said fiber Bragg grating and each additional fiber Bragg grating to tune at least relative time delays of different reflected spectral components nonlinearly with respect to wavelength in each respective Bragg reflection band to control dispersion in respectively reflected WDM channels;

combining and exporting said reflected WDM channels in an output optical fiber.

73. The method as in claim 61, wherein said spatial grating pattern has a grating period that is nonlinearly chirped along said optic axis.

74. The method as in claim 61, wherein said spatial grating pattern includes a spatial nonlinear chirp in one aspect of an index of refraction of said wave-guiding element along said optic axis.

* * * * *

UNITED STATES PATENT AND TRADEMARK OFFICE
CERTIFICATE OF CORRECTION

PATENT NO.      : 6,453,095 B2
DATED           : September 17, 2002
INVENTOR(S)     : Kai-Ming Feng et al.

It is certified that error appears in the above-identified patent and that said Letters Patent is hereby corrected as shown below:

Title page,
Item [56], OTHER PUBLICATIONS, please insert the following reference:
-- Tunable fiber grating dispersion using a plezoelectirc stack"; M.M. Ohn, et al.; OFC'97 Technical Digest, pgs. 155-156 --

Column 1,
Line 12, before FIELD OF THE INVENTION please insert the following:
--      STATEMENT AS TO FEDERALLY-SPONSORED RESEARCH
        This invention was made with government support under Grant No. EEC-9529152 awarded by the NSF. The government has certain rights in this invention. --

Signed and Sealed this

First Day of April, 2003

JAMES E. ROGAN
*Director of the United States Patent and Trademark Office*